(12) United States Patent
Chan et al.

(10) Patent No.: US 11,574,336 B1
(45) Date of Patent: Feb. 7, 2023

(54) APPARATUS FOR SECURE DECENTRALIZED REBATE MANAGEMENT

(71) Applicant: Rx Paradigm Inc., Claymont, DE (US)

(72) Inventors: Chris Chan, Claymont, DE (US); Mesfin Tegenu, Claymont, DE (US); Stephanie Do, Claymont, DE (US); Krzysztof Jagiello, Claymont, DE (US); Randy Ulloa, Claymont, DE (US)

(73) Assignee: Rx Paradigm Inc., Claymont, DE (US)

( * ) Notice: Subject to any disclaimer, the term of this patent is extended or adjusted under 35 U.S.C. 154(b) by 0 days.

(21) Appl. No.: 17/692,672

(22) Filed: Mar. 11, 2022

(51) Int. Cl.
*G06Q 30/00* (2012.01)
*G06Q 30/02* (2012.01)
(Continued)

(52) U.S. Cl.
CPC ......... *G06Q 30/0236* (2013.01); *G06F 21/34* (2013.01); *G06Q 40/08* (2013.01)

(58) Field of Classification Search
None
See application file for complete search history.

(56) References Cited

U.S. PATENT DOCUMENTS 5,126,514 A * 6/1992 Bommart ............... B60M 1/302
  191/22 DM
9,849,364 B2 * 12/2017 Tran ........................ G16H 50/30
(Continued)

FOREIGN PATENT DOCUMENTS

CN  112036983 A     12/2020
JP  2020010332 A *   1/2020  ............ G06F 21/32
(Continued)

OTHER PUBLICATIONS

Charlotta Edeland Therése Mörk. "Blockchain Technology in the Energy Transition: An Exploratory Study on How Electric Utilities Can Approach Blockchain Technology." (Jun. 21, 2018). Retrieved online Jun. 7, 2022. https://kth.diva-portal.org/smash/get/diva2:1235832/FULLTEXT01.pdf (Year: 2018).*

(Continued)

*Primary Examiner* — James A Reagan
(74) *Attorney, Agent, or Firm* — Caldwell Intellectual Property Law

(57) ABSTRACT

An apparatus for secure decentralized rebate management is presented. The apparatus includes at least a processor and a memory containing instructions configuring the at least a processor to receive a claim process request including a plurality of elements of a user data and generate a claim initial entry comprising a conditional claim trigger configured to deploy on an immutable sequential listing. The at least a processor is further configured to execute a claim mapping function including the at least a processor to generate a conditional rebate array including a plurality of rebate requirements, match each rebate requirement to each element of the user data, deploy a plurality of claim test entries representing matches on a private layer, and determine a claim mapping result. The at least a processor is configured to generate a claim result entry configured to deploy on the immutable sequential listing and execute the conditional claim trigger.

20 Claims, 11 Drawing Sheets

(51) Int. Cl.
     G06F 21/34      (2013.01)
     G06Q 40/08      (2012.01)

(56)            References Cited

U.S. PATENT DOCUMENTS

| | | | | |
|---|---|---|---|---|
| 10,127,502 | B2* | 11/2018 | Rourke | G16H 20/10 |
| 10,252,145 | B2* | 4/2019 | Tran | G06F 3/00 |
| 10,262,307 | B2* | 4/2019 | Hansen | G06Q 30/0205 |
| 10,645,021 | B2* | 5/2020 | Wang | G06Q 30/0207 |
| 11,130,042 | B2* | 9/2021 | Tran | A63B 71/145 |
| 11,139,081 | B2* | 10/2021 | Tran | G16H 50/70 |
| 11,194,919 | B2* | 12/2021 | Karia | G06F 21/64 |
| 11,393,568 | B2* | 7/2022 | Blackley | H04L 9/3247 |
| 2006/0247973 | A1* | 11/2006 | Mueller | G06Q 20/20 705/26.1 |
| 2006/0271441 | A1* | 11/2006 | Mueller | G06N 3/126 705/14.1 |
| 2009/0198520 | A1* | 8/2009 | Piovanetti-Perez | G06Q 10/087 705/26.1 |
| 2011/0029321 | A1* | 2/2011 | Rourke | G06Q 40/08 707/769 |
| 2012/0191570 | A1* | 7/2012 | Bennett | G06Q 20/20 705/26.1 |
| 2012/0253846 | A1* | 10/2012 | John | G16H 40/67 705/2 |
| 2014/0114472 | A1* | 4/2014 | Bossi | G06V 20/66 700/240 |
| 2015/0154626 | A1* | 6/2015 | Bennett | G06Q 30/0613 705/14.23 |
| 2015/0332283 | A1* | 11/2015 | Witchey | G16H 10/60 705/3 |
| 2016/0104188 | A1* | 4/2016 | Glyman | G06Q 30/0234 705/14.34 |
| 2016/0117471 | A1* | 4/2016 | Belt | G16H 20/10 705/2 |
| 2017/0232300 | A1* | 8/2017 | Tran | A63B 71/06 434/247 |
| 2017/0262594 | A1* | 9/2017 | Janin | G06Q 20/4016 |
| 2017/0300939 | A1* | 10/2017 | Chittilappilly | G06Q 30/0207 |
| 2017/0373849 | A1* | 12/2017 | Donner | H04L 9/0816 |
| 2018/0001184 | A1* | 1/2018 | Tran | G09B 19/0038 |
| 2018/0078843 | A1* | 3/2018 | Tran | G09B 19/0038 |
| 2018/0130050 | A1* | 5/2018 | Taylor | H04L 9/3236 |
| 2018/0357618 | A1* | 12/2018 | Hansen | G06Q 30/0611 |
| 2019/0005472 | A1* | 1/2019 | Hansen | G06Q 40/00 |
| 2019/0057763 | A1* | 2/2019 | Stockert | G16H 10/00 |
| 2019/0198144 | A1* | 6/2019 | Blackley | H04L 9/3239 |
| 2019/0244697 | A1* | 8/2019 | Farrell | G16H 20/10 |
| 2019/0378094 | A1* | 12/2019 | Quinn | G06N 20/00 |
| 2020/0090188 | A1* | 3/2020 | Wince | H04L 9/50 |
| 2020/0185070 | A1* | 6/2020 | Dahmani | G06F 21/602 |
| 2020/0201679 | A1* | 6/2020 | Wentz | G06F 9/468 |
| 2020/0251213 | A1* | 8/2020 | Tran | G06N 20/00 |
| 2020/0302470 | A1* | 9/2020 | Walsh | G06Q 20/3827 |
| 2020/0302562 | A1* | 9/2020 | Trim | G06Q 90/205 |
| 2020/0364358 | A1* | 11/2020 | Karia | H04L 63/10 |
| 2020/0411151 | A1* | 12/2020 | Puleo | G16H 10/60 |
| 2021/0004858 | A1* | 1/2021 | Arora | G06Q 30/0225 |
| 2021/0056638 | A1* | 2/2021 | Davis | G06Q 20/065 |
| 2021/0135841 | A1* | 5/2021 | Lee | H04L 9/3239 |
| 2021/0151136 | A1* | 5/2021 | Lee | G16H 10/20 |
| 2021/0248514 | A1* | 8/2021 | Cella | G06V 40/10 |
| 2021/0248621 | A1* | 8/2021 | D'Elia | G16H 15/00 |
| 2021/0281569 | A1* | 9/2021 | Soon-Shiong | G06F 16/21 |
| 2021/0342836 | A1* | 11/2021 | Cella | G06N 3/0454 |
| 2021/0354295 | A1* | 11/2021 | Cella | G06N 20/00 |
| 2021/0356941 | A1* | 11/2021 | Cella | G06N 20/20 |
| 2021/0357029 | A1* | 11/2021 | Cella | G06Q 30/0206 |
| 2021/0358032 | A1* | 11/2021 | Cella | G16Y 40/10 |
| 2021/0375415 | A1* | 12/2021 | Farrell | G16H 40/20 |
| 2022/0040557 | A1* | 2/2022 | Tran | G06F 1/163 |
| 2022/0058700 | A1* | 2/2022 | Karasulu | G06Q 30/0283 |
| 2022/0172206 | A1* | 6/2022 | Celia | G06Q 10/10 |
| 2022/0172207 | A1* | 6/2022 | Cella | G06Q 50/184 |
| 2022/0172208 | A1* | 6/2022 | Cella | G06N 3/088 |

FOREIGN PATENT DOCUMENTS

| | | | | |
|---|---|---|---|---|
| JP | 2021131860 | A * | 9/2021 | G06F 16/2365 |
| WO | 2019004650 | | 1/2019 | |
| WO | 2019157970 | | 8/2019 | |
| WO | 2020223428 | | 11/2020 | |

OTHER PUBLICATIONS

Najmeddine Dhieb et al. "A Secure AI-Driven Architecture for Automated Insurance Systems: Fraud Detection and Risk Measurement." (Mar. 25, 2020). Retrieved online Jun. 7, 2022. https://ieeexplore.IEEE.org/stamp/stamp.jsp?arnumber=9046765 (Year: 2020).*

Anokye Acheampong Amponsah et al. "Blockchain in Insurance: Exploratory Analysis of Prospects and Threats." Retrieved online Jun. 7, 2022. ps://www.researchgate.net/publication/348966176_Blockchain_in_Insurance_Exploratory_Analysis_of_Prospects_and_Threats/link/607ea9e7881fa114b41504fc/download (Year: 2021).*

Jessica Stoltz, Blockchain Application to the Pharmaceutical Supply Chain, Dec. 31, 2019.

Racher Press, Inc., Retail pharmacy embraces rapid advance of technology, Jan. 21, 2019.

Gal Hochberg, How Blockchain Could Save Big Pharma Billions, Sep. 23, 2020.

Brian N. Anderson, Greg O. Callahan, Michael Diprima, How blockchain technology will disrupt the PBM-payer-pharmacy relationship, Jul. 11, 2019.

* cited by examiner

APPARATUS FOR SECURE DECENTRALIZED REBATE MANAGEMENT

FIELD OF THE INVENTION

The present invention generally relates to the field of rebate management using blockchain technology. In particular, the present invention is directed to an apparatus for secure decentralized rebate management.

BACKGROUND

The ecosystem for entities administering prescribed medication, providing benefits plans, or distributing rebates, is mainly managed by pharmacy benefit managers. Currently, the discreet nature of contract negotiations by pharmacy benefit managers results in difficulties in efficient medication administration, expensive benefits plans, and fair competition among pharmacy benefits managers.

SUMMARY OF THE DISCLOSURE

In an aspect, an apparatus for secure decentralized rebate management is presented. The apparatus includes at least a processor and a memory containing instructions configuring the at least a processor to receive a claim process request, wherein the claim process request includes a plurality of elements of a user data and generate a claim initial entry configured to deploy on an immutable sequential listing, wherein the claim initial entry includes a conditional claim trigger. The memory configures the at least a processor to further execute a claim mapping function, wherein the claim mapping function includes the at least a processor to generate a conditional rebate array, wherein the conditional rebate array includes a plurality of rebate requirements, match each rebate requirement to each element of the user data, wherein the at least a processor is configured to deploy a plurality of claim test entries, wherein each claim test entry of the plurality of claim test entries represents a match on a private layer, and determine a claim mapping result. The memory configures the at least a processor to then generate a claim result entry configured to deploy on the immutable sequential listing, wherein the claim result entry is configured to execute the conditional claim trigger.

In another aspect, a method for secure decentralized rebate management is presented. The method includes receiving, by at least a processor communicatively connected to a memory, a claim process request, wherein the claim process request includes a plurality of elements of a user data, and generating a claim initial entry configured to deploy on an immutable sequential listing, wherein the claim initial entry includes a conditional claim trigger. The method further includes executing a claim mapping function, wherein the claim mapping function includes generating a conditional rebate array, wherein the conditional rebate array comprises a plurality of rebate requirements, matching each rebate requirement to each element of the user data, wherein the at least a processor is configured to deploy a plurality of claim test entries, wherein each claim test entry of the plurality of claim test entries represents a match on a private layer, and determining a claim mapping result. The method then includes generating a claim result entry configured to deploy on the immutable sequential listing, wherein the claim result entry is configured to execute the conditional claim trigger.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
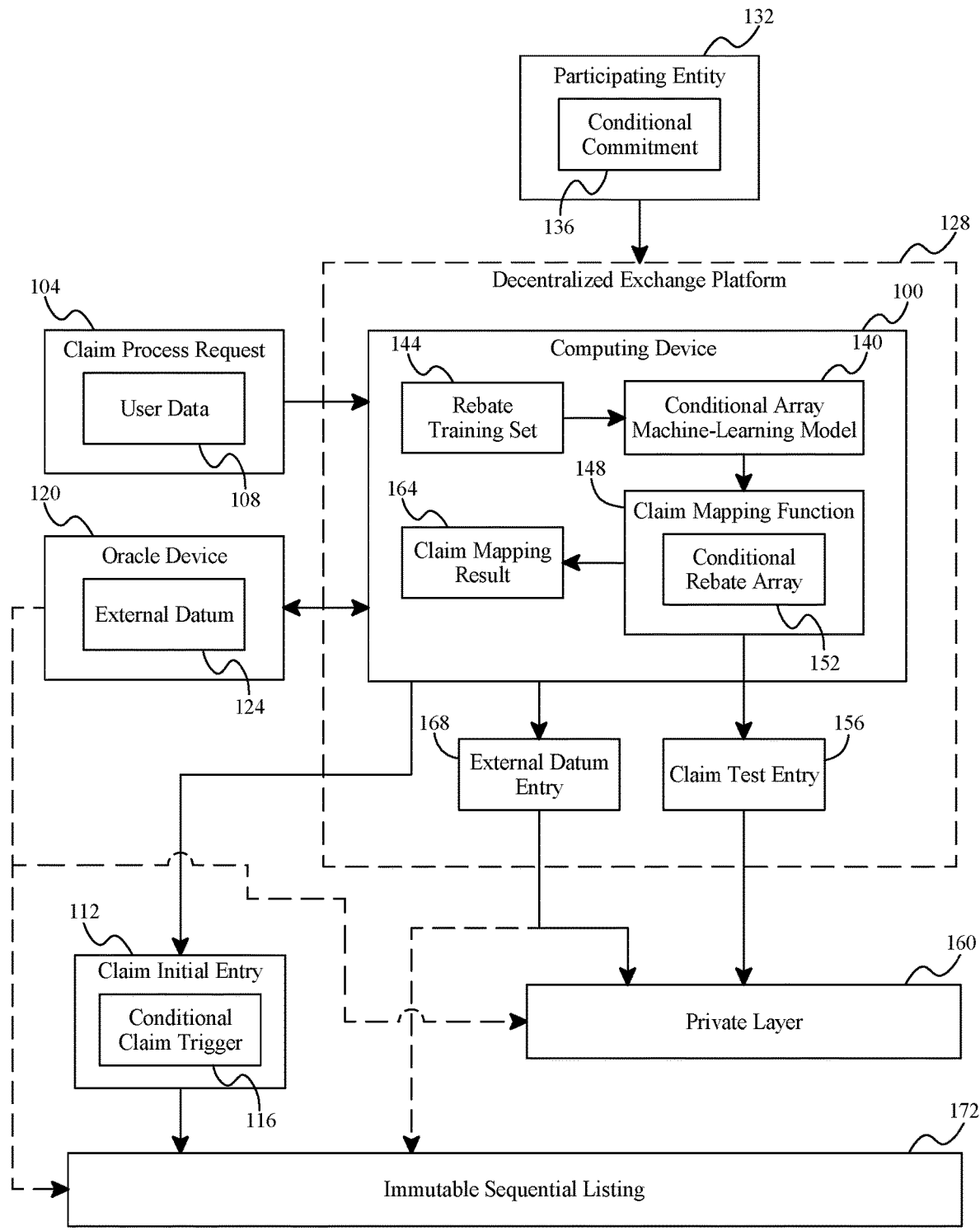
FIG. 1 is a block diagram of an exemplary embodiment of an apparatus for secure decentralized rebate management.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for secure decentralized rebate management. A "Pharmacy benefit manager" or "PBM" is an entity that manage prescription drug benefits on behalf of health insurers, Medicare Part D drug plans, large employers, pharmacies, pharmaceutical companies, drug manufacturers, and the like thereof. In one embodiment, PBMs manage and/or create a "formulary" containing an exclusive list of drugs categorized in different tiers that health insurers provide coverage for and/or drug manufacturers compete their product placement on top tiers for. In an embodiment, PBMs serve as a middleman between the entities manufacturing drugs, entities administering the drugs, and entities providing insurance and/or benefits for users of the drugs. In an embodiment, the apparatus includes a computing device that operates an online marketplace for PBMs in which pharmacies, manufacturers, and/or payers can interact with to find PBMs to conduct business with. Aspects of the present disclosure can include operating a decentralized marketplace incorporating blockchain technology. In an embodiment, a computing device can interact with a public blockchain used to store a plurality of transactions that each node and/or entity of the network establishes. This is so, at least in part, to provide a transparent network of transactions, contracts, and negotiations, enabling a competitive PBM industry.

Aspects of the present disclosure can be used to identify rebate eligibility of a patient's prescription claim. For instance, the apparatus can analyze a PBM's contract with a drug manufacturer, a pharmacy, and/or payer, by dissecting specific rebate conditions, terms, agreements, and the like thereof, and apply them to a patient's prescription claim. This is so, at least in part, to perform point-of-sale purchases when a patient purchases a prescriptive drug at a pharmacy. In an embodiment, the apparatus may incorporate a decision tree to identify and/or match a plurality of rules and/or terms regarding rebate eligibility to the patient's prescription claim. In an embodiment the apparatus can allow for contracted entities with a PBM such as the pharmacy, payer, and/or drug manufacturer, to update and/or modify specific rules and/or requirements for rebate eligibility within the boundaries of their contracts. Aspects of the present disclosure can also perform this identification confidentially. For instance, each entity is responsible for the privacy of their patients' information. To include private and secure patient information, the apparatus allows for conducting claim and rebate matching, claim processing, and/or patient data verification on a private layer of a blockchain such as a private blockchain. In an embodiment, other involved entities, such as a manufacturer seeking patient data prior to closing a rebate agreement, may request a verification in which the apparatus may conduct a Merkle proof of a transaction block within a public blockchain with a Merkle root containing transactional information about the specific patient. The Merkle proof may validate the data within its respective Merkle tree, thereby providing validity of the patient and its data to the manufacturer without exposing personal information about the patient.

Aspects of the present disclosure can be used to efficiently process prescription claims. For instance, by incorporating a public blockchain technology, relevant claims process, and or patient information may be accessible for verification, for which the apparatus may enable point-of-sale prescription purchases. In an embodiment, the apparatus may incorporate a private blockchain to authorize an entity's request to process claims and/or verify patients and their coverage. The apparatus may generate state channels and/or smart contracts enabling the instantaneous point-of-sale transactions within the decentralized network.

Aspects of the present disclosure can also be used to generate and/or update a PBM's formulary. For instance, the apparatus may analyze a plurality of claims and how many of them were eligible for certain rebates of the PBM's contracted drug manufacturer. Depending on the results of such analysis, the manufacturer may alter and/or provide feedback about certain specific rebate requirements (within the limitations of the manufacturer's contract with the PBM) to update the manufacturer's rebate terms. This is so, at least in part, to maximize profits for the manufacturer, optimize success rate of a formulary, and/or increase eligibility rate for patients within the limitations of a contract. In another embodiment, a payer may provide feedback to modify and/or update a formulary of the payer's contracted PBM to provide better coverage and increase eligibility of copays and/or coverage of prescribed drugs of the payer's insured patients. This is so, at least in part, to allow increased cost-saving coverage plans, formularies, and/or negotiated administered drugs while maximizing profits for all entities involved, with or without the services of PBMs.

Referring now to FIG. 1, an exemplary embodiment of an apparatus for secure decentralized rebate management is illustrated. The apparatus includes a computing device 100. computing device 100 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 100 may include a single computing device operating independently, or may include two or more computing device operating in concert, in parallel, sequentially or the like; two or more computing devices may be included together in a single computing device or in two or more computing devices. computing device 100 may interface or communicate with one or more additional devices as described below in further detail via a network interface device. Network interface device may be utilized for connecting computing device 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 100 may include but is not limited to, for example, a computing device or cluster of computing devices in a first location and a second computing device or cluster of computing devices in a second location. computing device 100 may include one or more computing devices dedicated to data storage, security, distribution of traffic for load balancing, and the like. computing device 100 may distribute one or more computing tasks as described below across a plurality of computing devices of computing device, which may operate in parallel, in series, redundantly, or in any other manner used for distribution of tasks or memory between computing devices. computing device 100 may be implemented using a "shared nothing" architecture in which data is cached at the worker, in an embodiment, this may enable scalability of system 100 and/or computing device.

With continued reference to FIG. 1, computing device 100 may be designed and/or configured to perform any method, method step, or sequence of method steps in any embodiment described in this disclosure, in any order and with any degree of repetition. For instance, computing device 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 100 includes a memory and at least a processor. The memory may include any memory as described in this disclosure. The memory may be communicatively connected to the at least a processor. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. The memory may be configured to provide instructions to the at least a processor, which may include any processor as described in this disclosure.

In a non-limiting embodiment and still referring to FIG. 1, computing device 100 may be configured to perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point −A as the point with negative y-coordinates, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

With continued reference to FIG. 1, apparatus 100 may be configured to operate a decentralized exchange platform 128. A "decentralized exchange platform," as is used in this disclosure, is a platform, device, and/or plurality of devices containing and/or implementing decentralized digital technology, where "decentralized digital technology" includes any form of digital technology using immutable sequential listings or other data structures capable of use in decentralized data storage, maintenance, and/or computation. Decentralized exchange platform may include, without limitation, any platform that allows participating entities within a PBM industry such as a pharmacy, drug manufacturer, health plan, payer, wholesaler, and the like thereof, to deal directly with each other and/or a PBM instead of meeting in a traditional exchange. Decentralized exchange platform 128 may be supported by any blockchain technologies. For example and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform 104 can make it is difficult if not impossible to discern a particular center. In some embodiments, decentralized exchange platform 128 can include a decentralized ecosystem. Decentralized platform 104 may serve as an ecosystem for decentralized architectures such as an immutable sequential listing and/or blockchain.

In a non-limiting embodiment, and still referring to FIG. 1, decentralized exchange platform 128 may implement decentralized finance (DeFi). "Decentralized finance," as used in this disclosure, as financial technology based on secure distributed ledgers similar. A decentralized finance architecture may include cryptocurrencies, software, and hardware that enables the development of applications. Defi offers financial instruments without relying on intermediaries such as brokerages, exchanges, or banks. Instead, it uses smart contracts on a blockchain. DeFi platforms allow people to lend or borrow funds from others, speculate on price movements on assets using derivatives, trade cryptocurrencies, insure against risks, and earn interest in savings-like accounts. In some embodiments, DeFi uses a layered architecture and highly composable building blocks. In some embodiments DeFi platforms may allow creators and/or owners to lend or borrow funds from others, trade cryptocurrencies and/or NFTs, insure against risks, and receive payments. In a non-limiting embodiment, Defi may eliminate intermediaries by allowing creators to conduct financial transactions through peer-to-peer financial networks that use security protocols, connectivity, software, and hardware advancements. Persons skilled in the art, upon reviewing the entirety of this disclosure, will be aware of the various embodiments of implementing decentralized finance for purposes as described herein.

Figure 8:
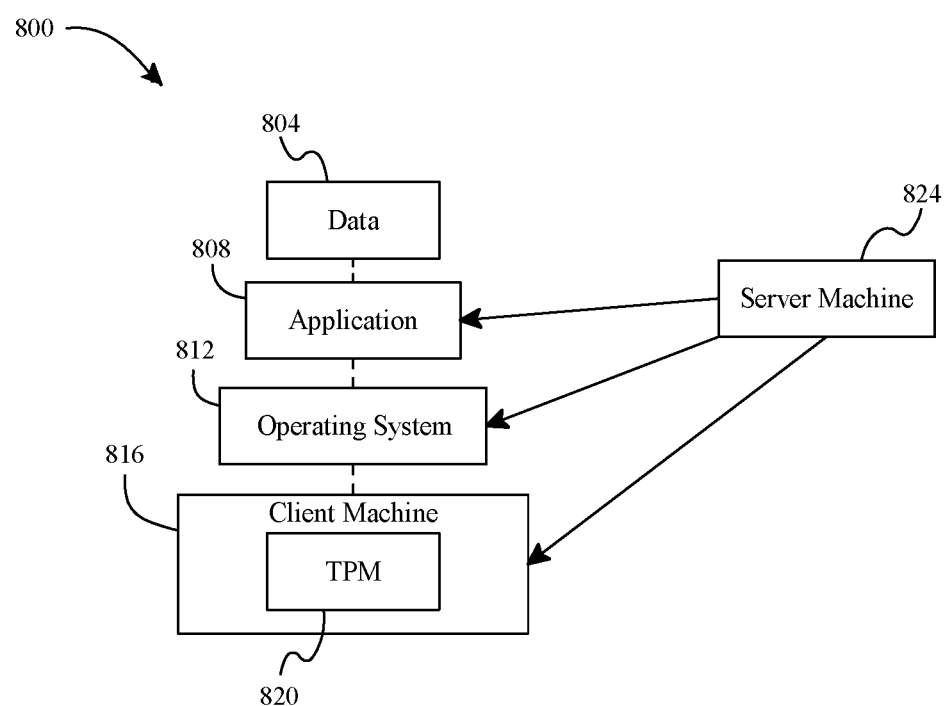
FIG. 8 is a block diagram of an exemplary embodiment of trusted computing architecture.

In a non-limiting embodiment, and still referring to FIG. 1, decentralized exchange platform 128 may implement Web 3.0. Whereas Web 2.0 is a two-sided client-server architecture, with a business hosting an application and users (customers and advertisers), "Web 3.0," as used in this disclosure, is an idea or concept that decentralizes the architecture on open platforms. In some embodiments, decentralized exchange platform 128 may enable communication between a plurality of computing devices, wherein it is built on a back-end of peer-to-peer, decentralized network of nodes (computing devices), the applications run on decentralized storage systems rather than centralized servers. In some embodiments, these nodes of computing devices may be comprised together to form a World Computer. A "World Computer," as used in this disclosure, is a group of computing devices that are capable of automatically executing smart contract programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer may be communicatively connected to immutable sequential listing 172 and/or computing device 100. Any digitally signed assertions on immutable sequential listing 172 may be configured to be confirmed by the World Computer. Alternatively or additionally, computing device 100 may be configured to store a copy of immutable sequential listing 172 into the memory of computing device 100. This is so, at least in part, to process a digitally signed assertion that has a better chance of being confirmed by the World Computer prior to actual confirmation. In a non-limiting embodiment, decentralized exchange platform 128 may be configured to tolerate localized shutdowns or attacks; it is censorship-resistant. In another non-limiting embodiment decentralized exchange platform 128 and/or computing device 100 may incorporate trusted computing as shown in FIG. 8. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of a decentralized platform for purposes as described herein.

With continued reference to FIG. 1, a "participating entity," as used in this disclosure, is an entity interacting with the apparatus and/or computing device 100 or with other entities. For example and without limitation, participating entity 132 may include, but not limited to, a vendor entity, retail entity, and a payer entity. A "vendor entity," as used in this disclosure, is an entity that creates and sells drugs. A manufacturing entity may include a pharmaceutical company, a drug manufacturer, and the like thereof. A "retail entity," as used in this disclosure, is an entity that distributes and/or sells drugs received from another entity such as a manufacturing entity. A retail entity may include a wholesaler that buys a bulk load of drugs from a vendor entity, a pharmacy that buys a bulk load of drugs from the wholesaler or a vendor entity itself and distributes them to retail customers, and the like thereof. A "payer entity," as used in this disclosure, is an entity that provides coverage for users such as patients. A payer entity may include a health plan, an employer, a company, and the like thereof.

In a non-limiting embodiment, and still referring to FIG. 1, decentralized exchange platform 128 may include a decentralized platform, network, server, and the like thereof. Decentralized exchange platform 128 may include a marketplace for which PBMs may list themselves for participating entities such as health plans, payers, drug manufacturers, pharmacies, and the like thereof, to choose from to form a transaction with. In a non-limiting embodiment, computing device 100 may incorporate a public blockchain that contains transactions denoting each PBM's business history, transaction history, claims processing histories, rebate negotiation histories, formulary histories, and the like thereof, for which each client entity may view. This is so, at least in part, for every participating entity, to conduct transparent transactions with each other and PBMs, thereby reducing a predatorial monopolistic PBM-to-manufacturer rebate negotiations that are usually conducted discreetly and/or inefficiently. Persons skilled in the art, upon reviewing the entirety of this disclosure, will be aware of the various embodiments of a marketplace in the context of rebate negotiation and management.

In some non-limiting embodiments, computing device 100 may enable the use of cryptocurrency. "Cryptocurrency," as used in this disclosure, is a digital or virtual currency that is secured by cryptography, which makes it nearly impossible to counterfeit or double-spend. In some embodiments, cryptocurrencies are decentralized networks based on blockchain technology such as that of immutable sequential listing 172 enforced by a network of computing devices called nodes. In some embodiments, computing device 100 may accept fiat money such as paper money. In some embodiments, computing device 100 may allow various types of cryptocurrency such as Ethereum (ETH), Litecoin (LTC), Cardano (ADA), Polkadot (DOT), Bitcoin Cash (BCH), Stellar (XLM), and the like thereof. Persons skilled in the art, upon reviewing the entirety of this disclosure, will be aware of the various embodiments of different types of money for purposes as described herein.

With continued reference to FIG. 1, computing device 100 may include a digital port enabling participating entity 132 to connect a digital wallet to an NFT-supported system such as decentralized exchange platform 124 and/or computing device 100. A "digital wallet," as used in this disclosure, is a software-based system that securely stores payment information and passwords of participating entity 132 for numerous payment methods and websites. By using a digital wallet, participating entity 132 can complete purchases easily and quickly with near-field communications technology. In a non-limiting embodiment, decentralized exchange platform 128 may include a web interface enabling participating entity 132 to deposit digital assets including, but not limited to fiat currency, cryptographic currency, and the like thereof, dependent on a conditional commitment 136. In some embodiments, computing device 100 may include a third party and/or enable a third party called "miners" to perform the minting process of a transaction. Persons skilled in the art, upon reviewing the entirety of this disclosure, will be aware of the various embodiments of minting and mining in the context of secure transactions.

With continued reference to FIG. 1, a "conditional commitment," as used in this disclosure, is a contract established between a PBM and participating entity 132. In another non-limiting embodiment, a conditional commitment can be stored as a smart contract and/or a cryptographic commitment. In a non-limiting embodiment, a PBM may utilize the apparatus to conduct currency transactions within the contract guidelines of conditional commitment 136. For example and without limitation, participating entity 136 such as a vendor entity may include conditional commitment 136 containing specific rebate agreements. A "rebate," as used in this disclosure, is a form of buying discount and is an amount paid by way of reduction, return, or refund that is paid retrospectively. A "rebate agreement," as used in this disclosure, is a negotiated agreement between a vendor entity and a PBM pursuant to or under which the vendor entity shall be obligated to pay rebates, administrative fees, data fees or other fees to the PBM, in each case as such agreement may be amended, restated, supplemented, renewed, or otherwise modified from time to time and any replacement or substitute agreement. For example and without limitation, a rebate agreement may include a condition requiring purchases between 0 USD and 100,000 USD of a certain drug to receive a 1 percent rebate, purchases between 100,001 USD and 600,000 USD of a certain pool of drugs to receive a 2 percent rebate retrospectively back to 1 USD, purchases over 600,001 USD receive 3 percent rebate retrospectively back to 1 USD, rebates to be paid quarterly, and/or a combination thereof. In a non-limiting embodiment, the rebate agreement may include a purchase price for a set of drugs to be dispensed by a retail entity that the PBM may pay for. Person of ordinary sill in the art, upon reviewing the entirety of this disclosure, would understand the various rebate agreement types for purposes as described herein.

In some embodiments and still referring to FIG. 1, conditional commitment 136 may include a formulary agreement. A "formulary agreement," as used in this disclosure, is a negotiated agreement between a PBM and a payer entity authorizing the PBM to manage the payer entity's formulary list (i.e., the medications for which plan beneficiaries including users and patients may receive coverage). The formulary agreement may require the payer entity to provide a payment to the PBM for administrative services, for the actual drug from a vendor entity (in which the PBM purchases from), and for paying for drug dispensing (in which the PBM pays a retail entity to do so). The formulary agreement enables the PBM to receive rebates from the vendor entity which the PBM may distribute to the payer entity and/or retail entity. For example and without limitation, a formulary agreement may include an agreement that an expensive vendor entity drug to be placed on the first tier of the formulary agreement. Person of ordinary sill in the art, upon reviewing the entirety of this disclosure, would understand the various formulary for purposes as described herein.

In some embodiments and still referring to FIG. 1, conditional commitment 136 may include a retail agreement. A "retail agreement," as used in this disclosure, is an agreement between a PBM and a retail entity denoting the dispensing of certain drugs. For example and without limitation, a retail agreement may include an agreement that a retail entity must dispense a specific number of drugs from a specific vendor entity for a price paid by the PBM. Person of ordinary sill in the art, upon reviewing the entirety of this disclosure, would understand the various types of agreements of a retail agreement for purposes as described herein.

With continued reference to FIG. 1, computing device 100 receives a claim process request 104. A "claim process request," as used in this disclosure, is a drug prescription claim of a user to purchase a prescribed drug. In a non-limiting embodiment, claim process request 104 may be provided to computing device 100 by a retail entity wherein a user requests to purchase a prescribed drug from. In another non-limiting embodiment, claim process request 104 may be received from a payer entity that collects claim process request 104 for a prescribed drug that the payer entity provides coverage for. In some embodiments, a user may request the purchase of a prescribed drug in which a retail entity may submit claim process request 104 to computing device 100 to verify if the user is covered by insurance and/or a payer entity for the prescribed drug and if the prescribed drug of the user is eligible for a rebate for a PBM. For instance, a PBM may negotiate a conditional commitment with a retail entity to dispense a prescribed drug of a vendor entity per a conditional commitment between the PBM and the vendor entity. Computing device 100 may identify if the PBM is eligible for a rebate based on the conditional commitment with the vendor entity if claim process request 104 contains a prescribed drug manufactured by a specific vendor entity administering the rebate. Person of ordinary sill in the art, upon reviewing the entirety of this disclosure of the various embodiments of a prescription claim for purposes as described herein.

With continued reference to FIG. 1, claim process request 104 may include a user data 108. A "user data," as used in this disclosure is a collection of information describing a user associated with claim process request 104. For example and without limitation, a user may enter a retail entity and purchase a prescribed drug. The vendor entity may then submit claim process request 104 wherein claim process request 104 contains information about the user such as, but not limited to, age, ethnicity, gender, insurance provider, level of insurance coverage, medical history, income, address, and the like thereof. This is so, at least in part, to verify if the user is covered or on some insurance plan to be eligible for coverage of a prescribed drug. Person of ordinary sill in the art, upon reviewing the entirety of this disclosure of the various embodiments and information pertaining to a user for purposes as described herein.

With continued reference to FIG. 1, computing device 100 is configured to generate a claim initial entry 112. A "claim initial entry," as used in this disclosure is an entry and/or blockchain entry denoting a transaction containing data representing claim process request 104. In a non-limiting embodiment, computing device 100 may generate claim initial entry 112 to a block of data, wherein the block of data is configured to be deployed on an immutable sequential listing 172. In another non-limiting embodiment computing device 100 may generate claim initial entry 112 as a transaction to be comprised in a block of entries to be deployed on immutable sequential listing 172. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. The immutable sequential listing as used in this disclosure is further described in FIG. 3. In a non-limiting embodiment, immutable sequential listing 172 may include a blockchain. A "blockchain," as used in this disclosure is a growing list of records, called blocks, which are linked together using cryptography. Each block contains a cryptographic hash of the previous block, a timestamp, and transaction data (generally represented as a Merkle tree, cryptographic accumulator, or the like thereof). Each entry such as claim initial entry 112 may be used to form a cryptographic accumulator, wherein the cryptographic accumulator is further described in FIG. 5. In some non-limiting embodiments, timestamp proves that the transaction data existed when the block was published in order to get into its hash. As blocks each contain information about the block previous to it, they form a chain, with each additional block reinforcing the ones before it. Therefore, the blockchain is resistant to modification of their data because once recorded, the data in any given block cannot be altered retroactively without altering all subsequent blocks. In some embodiments, the blockchain may be managed by decentralized exchange platform 128 and/or a World Computer such as a peer-to-peer network for use as a publicly distributed ledger, where nodes collectively adhere to a protocol to communicate and validate new blocks. Although blockchain records are not unalterable as forks are possible, blockchains may be considered secure by design and exemplify a distributed computing system with high Byzantine fault tolerance. In a non-limiting embodiment, immutable sequential listing 172 may include a public blockchain. Immutable sequential listing 172 may store a plurality of entries, transactions, and/or blocks containing information about participating entity 132 and its conditional commitment 136, a plurality of claim process requests, and the like thereof. Person of ordinary sill in the art, upon reviewing the entirety of this disclosure, would understand the various embodiments and contents of an immutable sequential listing for purposes as described herein.

With continued reference to FIG. 1, computing device 100 may be instructed to receive claim process request 104 and generate two entries: claim initial entry 112 denoting the initial transaction of an initiation of claim process request 104 and a claim result entry denoting the completion of claim process request 104. Claim initial entry 112 may include a conditional claim trigger 116. A "conditional claim trigger," as used in this disclosure, is an occurrence which, once conditions are met, deploys an update involving claim initial entry 112 on immutable sequential listing 172. In some non-limiting embodiments, conditional claim trigger 116 may include a smart contract. A "smart contract," as used in this disclosure, is an algorithm, data structure, and/or a transaction protocol which automatically executes, controls, documents, and/or records legally relevant events and actions according to the terms of a contract or an agreement. Objectives of smart contracts may include reduction of need in trusted intermediators, arbitrations and enforcement costs, fraud losses, as well as the reduction of malicious and accidental exceptions. In a non-limiting embodiment, conditional claim trigger 116 of claim initial entry 112 may trigger claim initial entry 112 to be added on immutable sequential listing 172 as a function of a quorum of entities and/or nodes representing the entities of immutable sequential listing 172 verifying claim initial entry 112. For example and without limitation, the quorum of entities and/or nodes may approve of the initial transaction of claim initial entry 112 based on a verification of the user and/or user data 108 from claim process request 104. In another non-limiting example, the quorum of entities and/or nodes may include the relevant parties for the completion of claim process request 104 including the payer entity responsible for covering for the user denoted by claim process request 104, the PBM receiving claim process request 104, and/or the vendor entity that manufactured the prescription drug identified by claim process request 104. Person of ordinary sill in the art, upon reviewing the entirety of this disclosure of the various entities and nodes involved in the verification of a blockchain transaction for purposes as described herein.

With continued reference to FIG. 1, claim initial entry 112 is configured to be deployed on immutable sequential listing 172 by an activation of conditional claim trigger 116, wherein conditional claim trigger 116 is activated by a digitally signed assertion. A "digitally signed assertion," as used in this disclosure, is a collection of textual data signed using a secure proof. A digitally signed assertion as used in this disclosure is further described in FIG. 3. In a non-limiting embodiment, claim initial entry 112 may be enabled to be posted on immutable sequential listing 172 as a function of a quorum of digitally signed assertions. For example and without limitation, a digitally signed assertion from a quorum of relevant parties. For instance, conditional claim trigger 116 may require a digitally signed assertion from the PBM utilizing the apparatus, a retail entity sending claim process request 104 to computing device 100, a payer entity providing coverage for the user denoted in claim process request 104, and/or a vendor entity manufacturing the prescription drug the user of claim process request 104 is purchasing and/or the prescription drug the payer entity is providing coverage for. Person of ordinary skill in the art, upon reviewing the entirety of this disclosure, of the necessary involvement of verifying a transaction in the context of claim processing.

With continued reference to FIG. 1, computing device 100 may generate, evaluate, and/or utilize digital signatures. In some embodiments, computing device 100 may submit a digitally signed assertion for verifying claim initial entry 112 and/or triggering conditional claim trigger 116 to be deployed on immutable sequential listing 172 using a digital signature. A "digital signature," as used herein, includes a secure proof of possession of a secret by a signing device, as performed on a provided element of data, known as a "message." A message may include an encrypted mathematical representation of a file or other set of data using the private key of a public key cryptographic system. Secure proof may include any form of secure proof as described in further detail below, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file. In some embodiments, the digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. In a non-limiting embodiment, the digital certificate may include a digital signature. In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. Persons skilled in the art, upon reviewing the entirety of this disclosure, will be aware of the various embodiments and implementations of using digital signatures for purposes as described herein.

With continued reference to FIG. 1, computing device 100 may include an oracle device 120 configured to detect and/or generate an external datum 124. An "oracle entity," as used in this disclosure, is an entity that connects a blockchain such as immutable sequential listing 172 to computing device 100, thereby enabling smart contracts such as conditional claim trigger 116 to execute based upon inputs and outputs from external datum 124. In a non-limiting embodiment, oracle device 120 may include, an input oracle, an output oracle, cross-chain oracle, compute-enabled oracle, and the like thereof. Oracle device 120 may utilize secure off-chain computation to provide decentralized services that are impractical to do on-chain due to technical, legal, or financial constraints, such as using Keepers to automate the running of smart contracts when predefined events take place, computing zero-knowledge proofs to generate data privacy, or running a verifiable randomness function to provide a tamper-proof, and provably fair source of randomness to smart contracts. Person of ordinary skill in the art, upon reviewing the entirety of this disclosure, of the various embodiments of an oracle device for purposes as described herein.

In some non-limiting embodiments and still referring to FIG. 1, computing device 100 may use oracle device 120 to access financial data about assets and markets. For example, decentralized money markets use oracle device 120 to determine users' prescription drug purchase capacity and check if users are purchasing prescribed drugs past coverage limits. In another non-limiting embodiment, computing device 100 may use oracle device 120 to peg the value of certain drug prices to negotiated contracts to determine if the value is fairly priced in according to the contracts and market prices to improve capital efficiency. In another non-limiting embodiment, oracle device 120 may offer participating entity 132 a secure blockchain middleware that allows them to connect their backend systems to any blockchain network including immutable sequential listing 172 and/or private layer 160. In doing so, participating entity 132 systems can read/write to any blockchain and perform complex logic on how to deploy assets and data across chains and with counterparties using the same oracle network. The result is institutions being able to quickly join blockchains in high demand by their counterparties and swiftly create support for smart contract services wanted by their users without having to spend time and development resources integrating with each individual blockchain. Person of ordinary skill in the art, upon reviewing the entirety of this disclosure, of the various applications of an oracle device for purposes as described herein.

With continued reference to FIG. 1, oracle device is configured to detect and/or generate an external datum 124. An "external datum," as used in this disclosure, is a collection of information obtained from the outside world. In a non-limiting embodiment, external datum 124 may include user information that was updated by a user and not previously recorded into immutable sequential listing 172. External datum 124 may include information regarding current events related to the pharmaceutical industry, trends in drug listing prices, demand for drugs, and the like thereof, which may result in a financial impact on participating entity 132. For example and without limitation, computing device 100 that generated conditional claim trigger 116 may interact with oracle device 120 such as an input oracle to verify the occurrence of insurable events during claims processing, opening up access to physical sensors, web APIs, satellite imagery, and legal data. An output oracle may be utilized to provide computing device 100 with a way to make payouts on claims using other blockchains or traditional payment networks. In a non-limiting embodiment, computing device 100 may be configured to generate an eternal datum entry 168 configured to be deployed on private layer 160. A "private layer," as used in this disclosure, is a second layer of immutable sequential listing 172 configured to conduct a private set of transactions. In a non-limiting embodiment private layer 160 may include a private blockchain, wherein computing device 100 acts as a central authority of private layer 160. In another non-limiting embodiment, private layer 160 may include a side chain. Computing device 140 may execute claim mapping function 148 via private layer 160 wherein each matching during the execution of claim mapping function 148 results in computing device 100 generating a claim test entry 156 for each match to be deployed on 160 and verified by a quorum of participating nodes and/or entities. Person of ordinary skill in the art, upon reviewing the entirety of this disclosure, of the various embodiments of a private layer in the context of another secure mode of transactions. Alternatively or additionally, external datum entry 168 may be deployed on immutable sequential listing 172. An "external datum entry," as used in this disclosure, is any entry, transaction, and/or block of transactions describing external datum 124. External datum entry 168 may be used cross reference the entries, transactions, and/or blocks in private layer 160 and/or immutable sequential listing 172 and provide an update with new real-world information from external datum 124. Person of ordinary skill in the art, upon reviewing the entirety of this disclosure, of the various applications of oracle devices in the context of blockchain.

With continued reference to FIG. 1, computing device 100 may be execute a claim mapping function 148. A "claim mapping function," as used in this disclosure, is a computational protocol that matches a plurality of rebate requirements of a conditional rebate array 152 to elements of user data 108 associated with claim process request 104. In a non-limiting embodiment, claim mapping function 148, as used in this disclosure, is further described in FIG. 2. Claim mapping function 148 includes instructions for computing device 100 to generate conditional rebate array 152. A "conditional rebate array," as used in this disclosure, is an array, linked list, vector, or similar data structure of rebate requirements denoting individual rules, terms, and/or agreements pertaining to a rebate agreement as described herein and/or conditional commitment 156. Claim mapping function 148 may determine a claim mapping result 164. A "claim mapping result," as used in this disclosure, is an output and/or an outcome of claim mapping function 148 denoting the eligibility of a user from user data 108 for a rebate within the limitations of conditional commitment 136. For example and without limitation, claim mapping result 164 may indicate that the user, based on user data 108 and/or claim process request 104, is eligible for coverage for a prescribed drug, wherein the prescribed drug was dispensed as a function of a retail agreement between a retail entity and a PBM. Claim mapping result 164 may indicate that the prescribed drug of the user is a drug manufactured by a specific vendor entity thereby qualifying the PBM for a rebate, or at least an addition to a total purchase requirement to qualify for a rebate. Person of ordinary skill in the art, upon reviewing the entirety of this disclosure, of the various embodiments of a rebate eligibility result from a claim in the context of rebate qualification.

With continued reference to FIG. 1, computing device 100 may generate conditional rebate array 152 for claim mapping function 152 using a conditional array machine-learning model 140. A "conditional array machine-learning model," as used in this disclosure, is any machine-learning model, process, and/or algorithm trained to output claim mapping result using a rebate training set 144. A "rebate training set," as used in this disclosure, is a training data containing a rebate requirement correlated to a rebate qualification. A "rebate requirement," as used in this disclosure, is a specific rebate agreement for a particular drug from a vendor. In a non-limiting embodiment, rebate training set 144 may be provided as an input by participating entity 132 and/or any entity as described herein. In another non-limiting embodiment, rebate training set 144 may be derived from previous claim process requests and the like thereof. A "rebate qualification," as used in this disclosure, is a determination of a claim constituting a rebate as a function of the terms of a rebate requirement being met. In another non-limiting embodiment, rebate training set 144 may be stored and/or retrieved from private layer 160. Computing device 100 may input conditional array machine-learning model 140 with user data 108 to output conditional rebate array 152 using rebate training set 144. Person of ordinary skill in the art, upon reviewing the entirety of this disclosure, will be aware of the various embodiments of a machine-learning in the context of generating a conditional rebate array.

Alternatively and additionally, and still referring to FIG. 1, computing device 100 may be configured to store and/or retrieve rebate training set 144 and/or any training set from a rebate transaction database. A "rebate transaction database," as used in this disclosure, is a database and/or data storage system used to store any training data and/or datum for the apparatus and/or computing device 100. The database may be implemented, without limitation, as a relational database, a key-value retrieval database such as a NOSQL database, or any other format or structure for use as a database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, computing device 100 may generate at least a claim test entry 156 as a function of claim mapping function 148. A "claim test entry," as used in this disclosure, is any entry, block, and/or transaction describing a match of a rebate requirement of conditional rebate array 152 to an element of user data 108. A "match," as used in this disclosure, is a process of applying a rebate requirement to an element of user data 108 to identify if an element of user data 108 fulfills a rebate agreement and vice versa. The match and/or matching of, as used in this disclosure, is further described in FIG. 2. Computing device 100 may be configured to deploy claim test entry 156 on private layer 160

Figure 2:
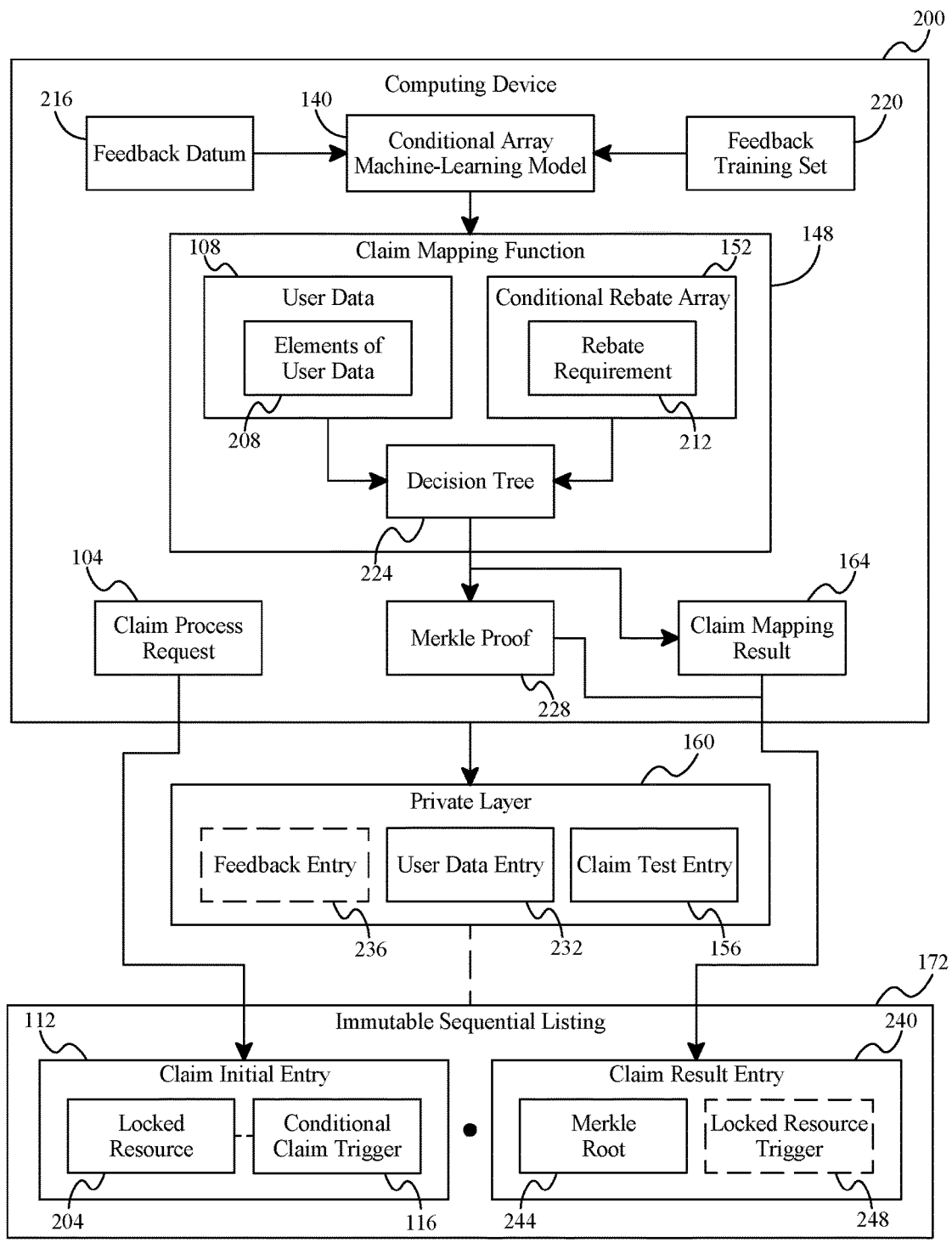
FIG. 2 is a block diagram of another exemplary embodiment illustrating an apparatus for secure decentralized rebate management in accordance with aspects of the present disclosure.

Referring now to FIG. 2, a block diagram of another exemplary embodiment of an apparatus for secure decentralized rebate management in accordance with aspects of the present disclosure is illustrated. The apparatus may include a computing device 200. Computing device 200 may be consistent with computing device 100 in FIG. 1 and/or any computing device as described herein. Computing device 200 may be configured to receive a feedback datum 216. A "feedback datum," as used in this disclosure, is a datum and/or collection of information describing inputs from any participating entity as a result of a previous iteration of a claim mapping result, wherein the inputs are configured to potentially alter a subsequent claim mapping result and/or any response to be made as a function of an undesired claim mapping result. In another non-limiting embodiment feedback datum 216 may include any updates and/or modifications to be made to conditional rebate array 140 as long as those updates and/or modifications are allowed within the limitations of a conditional commitment. In some embodiments, computing device 200 may generate feedback datum 216 as a function of a continual learning. For example and without limitation, computing device 200 may continuously collect feedback from one or more participating entities to refine the specific contents and rules of conditional rebate array 140. In another example, the feedback may include modifying rules that are better applied to specific claim process requests. In another non-limiting embodiment, computing device 200 may deal with edge cases and novel issues by compiling feedback into feedback datum 216 to be fed into conditional array machine-learning model 140 as an input.

With continued reference to FIG. 2, computing device 200 may be configured to generate a state channel as a function of claim process request 104. A "state channel," as used in this disclosure, is a technique designed to allow users to make multiple blockchain transactions such as state changes or money transfers, without committing all of the transactions to the blockchain. For instance and without limitation, in the traditional state channel, only two transactions are added to a blockchain such as immutable sequential listing 172, but an infinite or almost infinite number of transactions can be made between the participants. The two transactions may include a claim process request 104 and claim mapping result 164. The infinite or almost infinite number of transactions may include the transactions resulting from claim mapping function 148 and/or any verification of any datum as described herein. Such infinite or almost infinite number of transactions may be recorded in private layer 160. In a non-limiting embodiment, the state channel may include a payment channel, wherein the payment channel is configured to facilitate transfer of monetary resources associated with a transaction, such as the transfer of locked resource 204. Alternatively and additionally, a state channel may include a smart-contract that enforces predefined rules for off-chain transactions. Each transaction creates a new state based on the previous state, signed by each party, which is cryptographically provable on the blockchain. Every new state makes the last state invalid since the smart contract acknowledges only the highest state as a valid state. In a non-limiting embodiment, a state channel may include a unidirectional channel and/or a bidirectional channel. Person of ordinary skill in the art, upon reviewing the entirety of this disclosure, of the various embodiments of a state channel its transactions for purposes as described herein.

With continued reference to FIG. 2, conditional rebate array 152 may include a plurality of rebate requirements. A "rebate requirement," as used in this disclosure, is an element of a rebate agreement consisting of an individual requirement among a plurality of requirements that must be fulfilled for rebate eligibility. For example and without limitation, rebate requirement 212 may include a requirement that a claim process request 104 of a user makes a PBM eligible for a rebate. Computing device 200 may execute claim mapping function 148 wherein claim mapping function matches rebate requirement 212 of a plurality of rebate requirements with an element of user data 208 of a plurality of elements of user data from user data 108. An "element of user data," as used in this disclosure, is an individual piece of user information of a user data 108. For example and without limitation, element of user data 208 may include if prescription drug from claim process request 104 is a specific vendor entity provided drug within a rebate agreement. In another example, element of user data 208 may include information about the specific dosage of a prescribed drug that makes a PBM eligible for a rebate. Computing device 200 and/or claim mapping function 148 may include generating a user data entry 232 representing each element of user data 208 to be deployed on private layer 160. A "user data entry," as used in this disclosure, is an entry, transaction, and/or block of transactions denoting an element of user data 208. In a non-limiting embodiment, each user data entry 232 may be used to verify user data 108 and/or element of user data 208. Computing device 200 and/or claim mapping function 148 may including matching each rebate requirement 212 to each element of user data 208. In some embodiments, matching may include implementing a decision tree 224, which is further described in FIG. 4. A "decision tree," as used in this disclosure, is a flowchart-like structure in which each internal node represents a "test" on an attribute, each branch represents the outcome of the test, and each leaf node represents a class label. In some non-limiting embodiments decision tree 224 may include a structure for matching rebate requirement 212 to element of user data 208. In some non-limiting embodiments, a decision tree may be used to verify user data 108 and/or elements of user data 208. In another non-limiting embodiment, each match and/or node of decision tree 224 representing a matching of rebate requirement 212 to element of user data 208 may be denoted by claim test entry 156 of a plurality of claim test entries to be deployed on private layer 160. Person of ordinary skill in the art, upon reviewing the entirety of this disclosure, of the various transactions generated from a claim mapping function for purposes as described herein.

With continued reference to FIG. 2, computing device 200 may be configured to generate conditional rebate array 140 using conditional array machine-learning model 140 for claim mapping function 148, wherein computing device 100 may be configured to train conditional array machine-learning model 140 using feedback training set 220 and feedback datum 216 as an input. A "feedback training set," as used in this disclosure, is a rebate requirement update correlated to the claim mapping result. A "rebate requirement update," as used in this disclosure, is an update to a previous rebate requirement representing feedback datum 216. In some embodiments, the rebate requirement update may be consistent with a previous rebate requirement, wherein each rebate requirement is stored in some data storage system such as, but not limited to a rebate transaction database, private layer 160, and/or immutable sequential listing 172. Feedback training set 220 may include a claim mapping result outcome based on a rebate requirement that incorporates feedback datum 216 and/or rebate requirement that similarly incorporates feedback datum 216. Computing device 200 may instruct conditional array machine-learning model 140 to output conditional rebate array 152 as a function of feedback training set 220. Person of ordinary skill in the art, upon reviewing the entirety of this disclosure, of the various embodiments of machine-learning in the context of incorporating continuous feedback.

In another non-limiting embodiment, and still referring to FIG. 2, computing device 200 may be configured to generate a feedback entry 236. A "feedback entry," as used in this disclosure, is any entry, transaction, and/or block of transactions containing feedback datum 216 and/or elements of feedback datum 216. Computing device 200 may deploy feedback entry 236 on private layer 160. For instance and without limitation, feedback provided by a relevant participating entity may be confidential in which private layer 160 may serve to store any private and/or confidential transactions in. This is so, at least in part, to maintain confidentiality of certain rebate requirements as each rebate requirement 212 may be unique and each updated rebate requirement based on feedback datum 216 may also be unique. Person of ordinary skill in the art, upon reviewing the entirety of this disclosure, of the various transactions of entity to be recorded into a blockchain for purposes as described herein.

In some non-limiting embodiments and still referring to FIG. 2, each entry may be deployed as a function of a digitally signed assertion. The digitally signed assertion may be consistent with any digitally signed assertion as described in the entirety of this disclosure. In a non-limiting embodiment, a digitally signed assertion may include a proof. The proof may be carried out by any proof as described in the entirety of this disclosure. In another non-limiting embodiment, computing device 100 may provide proof as a function of a cryptographic function. The cryptographic function may identify any private layer 160 entry such as claim user data entry 232, claim test entry 156, and/or feedback entry 236. In a non-limiting embodiment, the cryptographic function may reveal certain entry contents without revealing the identity of the user and/or entity associated with the entry to maintain confidentiality. This may be satisfied by entries within a public blockchain such as immutable sequential listing 172, wherein each entry in immutable sequential listing 172 contains a Merkle root denoting a Merkle tree wherein the nodes of a Merkle tree may be represented as entries in private layer 160. A "cryptographic function," as used in this disclosure, is any function that generates an output that may be conclusively linked via proof or verification to each participating device, but from which it is impossible and/or computationally infeasible to discover the contents of any private entries. In an embodiment, cryptographic function may produce a cryptographic hash, also referred to by the equivalent shorthand term "hash," of computing device 100. A cryptographic hash, as used herein, is a mathematical representation of a lot of data, such as files or blocks in a block-chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, and continuing to refer to FIG. 2, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may be on the order of $O(2^{n/2})$ for n output bits; thus, it may take on the order of $2^{256}$ operations to locate a collision in a 612 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Alternatively or additionally, and still referring to FIG. 2, output of cryptographic function may include a secure proof of possession. A secure proof, as used herein, is a protocol whereby an output is generated that demonstrates possession of a secret, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange.

In a non-limiting embodiment, the proof may include a zero-knowledge proof, which may provide an output demonstrating possession of a secret while revealing none of the secret to a recipient of the output. Zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 2, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup. ZK-STARKS may not rely on private-public key pairings but may rely on collision resistant hashing and a random oracle model. Collision resistant hashing may be measured if it is hard to find two inputs that hash to the same output, which is two inputs such as a and b such that $H(a)=H(b)$, and a b. Collision resistant hash functions may include a strong one-way hash function. ZK-STARKS may utilize collision-resistant hash functions to convert a STIK into an interactive argument of knowledge system, whereby a STIK is defined as a Scalable Transparent Interactive Oracle Proof of Knowledge. A ZK-STIK may be proven to be unconditionally sound, even against computationally unbounded provers. If the STIK has perfect ZK, then the argument system has computational ZK. Any realization of a STIK using this technique may be considered interactive. Collision resistance may be desirable for example, when a party may attest to a document by publishing a public key signature on a hash of the document. A malicious actor may be able to get a party to attest to one document and then produce another document copying that attestation thereby producing the same hash and claiming the other party had attested to both documents. Collision resistance hashing may also be employed for example when parties compare cryptographic hashes of two instances of a file to make sure they both have the same version. A bad actor could produce two files each containing the same hash and trick users into believing they had the same version of a file when in fact they did not. ZK-STARKS may also utilize a random oracle model. Random oracle output may include an output that responds to every unique query with a truly random or pseudorandom response chosen uniformly or preferentially from its output domain; in an embodiment, a pseudorandom output is one that is infeasible to predict prior to performing steps of random oracle, such as without limitation an output including an output of a cryptographic hash function performed on each unique query. If a query is repeated the output may respond the same way every time that query is submitted. In an embodiment, a random oracle output may include a mathematical function chosen uniformly at random, so that each possible query has an output of a fixed random response. A random oracle may include a verifiable delay function, e.g. a function based on exponentiation in a group of unknown order, a verifiable random function as demonstrated by DFINITY of Zug, Switzerland, a random beacon, such as without limitation a high entropy source such as true random number generator (TRNG) that is signed and timestamped by a device with trusted properties. Using the random oracle model any STIK can be compiled into a non-interactive argument of knowledge in the random oracle knowledge. If the STIK has perfect ZK then the resulting construction has computational zero knowledge. Realization of a STIK using this technique may be considered non-interactive STARK. Decisions as to whether to use interactive or non-interactive ZK-STARKS may be determined by a computing device.

With continued reference to FIG. 2, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 2, cryptographic function may be performed using one or more privacy-preserving protocols. A "privacy-preserving protocol," as used in this disclosure, is a protocol that makes it impossible or computationally infeasible to determine an identity of a party performing a test, who may be referred to as a "tester" for the purposes of this disclosure, given an output of the cryptographic function. As a non-limiting example, where a test issuer distributes test kits, tester may be able to publicly report and prove the validity of a result using a privacy-preserving protocol, without the test issuer being able to map that result to a given tester, even if the test issuer has kept track of which test kit (with what code) it issued to what tester. In an embodiment, privacy-preserving protocol may include participation by test issuer and/or operator of computing device 104 or other device operated by a test issuer (any of which may be referred to for the purposes of discussion of this discussion of privacy-preserving protocols as a "test issuer") and one or more testers and/or devices operated thereby, including without limitation a secure test apparatus 108, and/or user device, where tester and/or device operated thereby may be referred to for the sake of discussion of privacy-preserving protocols as the tester, in a set of intercommunications, exchanges of information, and/or instantiation and/or evaluation of cryptographic objects and/or primitives to enact privacy-preserving protocol. In an exemplary embodiment, a test issuer, prior to any testing, may publish to data store, including without limitation an immutable sequential listing and/or any data store described in this disclosure, a cryptographic commitment as defined below to a set of all potential exposed secret test result identifiers across all tests. A "cryptographic commitment," as used in this disclosure, is any digitally signed assertion defining a transaction configured to trigger some conditional requirement. Non-limiting examples of cryptographic commitments are Pedersen commitments and Fujisaki-Okamoto commitments. Using a one-out-of-many cryptographic proof, a tester may issue a proof that it knows one of those codes without revealing which of them it knows. As a non-limiting example, a one-of-many proof may be performed with respect to a list of commitments, such as Pedersen commitments, sounding in homomorphic cryptographic systems, which may include a list of commitments to set of all potential exposed secret test result identifiers across all tests. A prover, such as a user device and/or secure testing apparatus, may demonstrate knowledge of an opening of commitment $C\_i=g^x h^z h^{s'}$, for g, h, generators over a group used as a basis for the encryption, by revealing $(z+s)$. Verification may be performed by multiplying each of the commitments by $h^{-(z+s)}$; for $C\_i$, this will result in a commitment to 1 (i.e., it may be demonstrated that this is an encryption of 1). Thus, knowledge of the opening of an element of the set of commitments may be demonstrated without revealing which element is known or opening the commitment. Furthermore, a one-out-of-many proof may reveal a serial number such that it cannot be issued multiple times for the same element without detection; in the above example, $(z+s)$ may be public and formed using the serial number and secret key of the test kit, and thus duplicate proof attempts may be detected. This may prevent a single result from being reported by many individuals without detection.

As a further non-limiting example, and still referring to FIG. 2, a privacy-preserving function may be performed using a combination of techniques from cryptographic computation families of multiparty computation and oblivious transfer. In one illustrative example, a test issuer may distribute test kits to testers. Each test kit may include code, such as a QR code or other code that is visible, which may have a small number of bits. Each test kit also may include a secret test result, which may have a small number of bits. Test issuer may potentially have recorded which test kit it gave to which tester. In an embodiment, tester may perform test and send to test issuer $g^x h^y$ where x and y are random numbers, g and h are group elements over an elliptic curve group, such as without limitation elements of a group over Curve25519, and q is a visible code on the test kit. The tester may also use the exposed code from the test kit, here denoted for purposes of discussion as "b," to request a result-specific result from the issuer via oblivious transfer. For instance, for a set of s codes indexed by b, where one of them (s') indicates a positive, an honest positive tester will have revealed the index b that corresponds to s'; to retrieve s', the tester may engage in oblivious transfer with the test issuer, such as without limitation via the chou orlandi scheme. This may prevent test issuer from knowing whether tester has a correct positive b or a different one. As used herein, an "oblivious transfer" is a protocol whereby a recipient, such as without limitation tester, requests one or more values of a plurality of values from a sender, such as without limitation test issuer, which then returns the requested values to recipient, without the sender being able to know which values the sender has transmitted and without the recipient learning any of the plurality of values besides the requested values. Test issuer may determine whether test issuer has previously received a query and/or request for oblivious transfer referencing q; if so, test issuer may ignore request, to avoid attacks where a tester queries repeatedly to undermine the integrity of system 100 by posting multiple results. Issuer may return a numerical code at index b to tester from a list of codes, as part of the oblivious transfer exchange, where numerical code may be implemented in any manner as described above. Note that, by virtue of oblivious transfer protocol, issuer may not know what index tester sent or what code it has sent back to tester. Test issuer may publish $g^x h^y h^s = g^x h^{(y+s)}$ to some data repository such as a rebate transaction database, any immutable sequential listing, any blockchain, or other data store where s is the code that would have been exposed on the test kit if the result were positive. A similar publication, without loss of generality, may be made for negative results. Tester may now create a 1-out-of-many proof as described above to prove a given result without revealing its identity. Value y+s, which may be unique and/or unpredictable, may be exposed as part of the proof which may ensure that no party or listener can issue another proof using the same test; in other words, a given test result may be reportable only once if following the protocol. In order to mitigate ability of test issuer or other parties to conduct time correlations between the steps above, the tester may utilize a stochastic delay function, whereby a party receives a message to forward, but selects a random waiting time to forward it, thus eliminating the time correlation between receiving a message and forwarding it. In an embodiment, a stochastic delay, for instance and without limitation drawn from an exponential distribution, may mitigate correlation attacks; stochastic delay function may be employed between each step, possibly with longer waits when there is lower reporting activity on the block-chain. In an embodiment, the above-described protocol may be useful in a situation where secret test result on secure test apparatus 108 is unable to encode sufficient bits to be highly difficult to predict.

With continued reference to FIG. 2, computing device 200 may generate claim initial entry 112 as a first initial transaction of a state channel for claim process request 104. Claim initial entry may include a locked resource 204 and conditional claim trigger 116. A "locked resource," as used in this disclosure, is a payment that a paying party is committed to but may only be processed upon a contingent event occurring. Thus, once a locked payment has been posted, it may be irrevocable for the payer that posts it, but unavailable to the recipient device until the latter has performed an action upon which unlocking the payment is contingent. As a non-limiting example, a locked payment may include a zero-knowledge contingent payment. A "zero-knowledge contingent payment," as used in this disclosure, is a payment that is posted in a non-spendable form, which may be converted to a spendable form by provision of an element of data. A proprietor and/or community operating some immutable sequential listing may require a secure proof, a password, or other provision of datum and/or proof of performance of a given process as a condition for a valid expenditure of value in the zero-knowledge contingent payment. In an embodiment, computing device 100 may create a locked payment as a good-faith bond, for instance to insure against the possibility of loss of data or the like; locked payment may be released upon failure of computing device 100 to demonstrate storage of data. In a non-limiting embodiment, locked resource 204 may include a payment to be made by a retail entity to a PBM as a function of a completion of a claim process request 104. In another non-limiting embodiment, locked resource 204 may include a payment such as a rebate to be provided to the PBM by a vendor entity as a function of a fulfillment of rebate requirement 212. Person of ordinary skill in the art, upon reviewing the entirety of this disclosure, of the various embodiments of payments in the context of rebate management.

With continued reference to FIG. 2, claim mapping function 148 may match each rebate requirement 212 to each element of user data 208 via decision tree 224. In some non-limiting embodiments, decision tree 224 may include nodes comprising each match and/or matching to be verified. In a non-limiting embodiment, computing device 200 may verify each node of decision tree 224. For example and without limitation, a participating entity may seek to verify a user in the event an update of the user information had occurred for which computing device 200 may have already deployed the updated information as a user data entry in private layer 160. Alternatively and additionally, computing device 200 may utilize an oracle device to verify such update. Computing device 200 may use a crypto-chip authentication to verify user data entry 232 and/or any entry in private layer 160. A "crypto-chip authentication," as used in this disclosure, is a process of authentication using hardware security that ensures that the keys being used to encrypt and decrypt data such as user data entry 232 and/or any other entry in private layer 160 are real keys associated with that cryptography. In some non-limiting embodiments, the crypto-chip authentication may generate new keys to ensure that those keys can only be accessed by entities of private layer 160 and authorized by computing device 200. In some non-limiting embodiments, the real keys may be coded into the hardware. In a non-limiting embodiment, computing device 200 may implement security and/or authentication using multifactor identification, geofencing, heuristics, device fingerprinting, attestation, cryptographic accumulation, and the like thereof. Person of ordinary skill in the art, upon reviewing the entirety of this disclosure, of the various embodiments of cryptographic authentication for purposes as described herein.

With continued reference to FIG. 2, computing device 200 may generate a Merkle tree wherein each node of the Merkle tree comprises a plurality of nodes wherein each node comprises user data entry 232. In a non-limiting embodiment, once claim mapping function 148 is completed and outputs claim mapping result 164, indicating that a PBM is eligible for a rebate based on claim process request 104, computing device 200 may then verify if user data 108 is accurate. For instance, a user may have switched health plans from one payer entity to another. The user may have opted out or become unqualified for a specific health plan that may affect the coverage of a prescription drug the user intends to purchase. A participating entity such as a retail entity, vendor entity, and/or payer entity may want to verify entries in private layer 160 to complete the processing of claim process request 104. For instance, computing device 200 may verify the entries as a function of a Merkle proof 228. If the user has updated its information and coverage information, the Merkle tree generated by computing device 200 may already have incorporated that update into the Merkle tree. The participating entity may hold its most recent confidential user data which it may use to check if it is the same as the user data in the relevant Merkle tree. If an update has been made by the user, Merkle proof 228 may indicate such update, resulting in claim process request 104 to be result in an ineligible rebate for the PBM and prescription drug for the user. The result of Merkle proof 228 and/or claim mapping result 164 may include the completion of claim mapping function 148 and/or claim process request 104 which may conclude the initial transaction of claim initial entry 112. In a non-limiting embodiment, the concluded transaction may include claim result entry 240, thereby closing the state channel as described herein. In another non-limiting embodiment claim result entry 240 may include Merkle root 244 wherein Merkle root 244 comprises the Merkle tree and an indication of the conclusion of claim process request 104. In another non-limiting embodiment claim result entry 240 may include a locked resource trigger 248. A "locked resource trigger," as used in this disclosure, is any trigger that activates a condition of conditional claim trigger 116, thereby deploying claim result entry 240 on immutable sequential listing 172 and completing any relevant payment transfers for the participation of any relevant entity. Person of ordinary skill in the art, upon reviewing the entirety of this disclosure, of the various embodiments and resulting actions of a concluding transaction entry in the context of smart contracts.

With continued reference to FIG. 2, "verification," as used in this disclosure, is a process of ensuring that which is being "verified" complies with certain constraints, for example without limitation system requirements, regulations, and the like. In some cases, verification may include comparing a product, such as without limitation, element of user data 208 against one or more acceptance criteria such as rebate requirement 212 and/or conditional rebate array 152 and vice versa. Ensuring that the resulting decision tree 224 and/or claim mapping result 164 is in compliance with acceptance criteria may, in some cases, constitute verification. In some cases, verification may include ensuring that data is complete, for example that all required data types, are present, readable, uncorrupted, and/or otherwise useful for computing device 200. In some cases, some or all verification processes may be performed by computing device 200. In some cases, at least a machine-learning process, for example a machine-learning model, may be used to verify. Computing device 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

With continued reference to FIG. 2, "validation," as used in this disclosure, is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation, element of user data 208 against a specification denoted by rebate requirement 212 and/or conditional rebate array 152 and vice versa. In some cases, computing device 100 may be additionally configured to validate a product by validating constituent sub-products. In some embodiments, computing device 100 may be configured to validate any product or data, for example without limitation claim mapping result 164 and/or each entry in private layer 160. In some cases, at least a machine-learning process, for example a machine-learning model, may be used to validate by computing device 100. Computing device 100 may use any machine-learning process described in this disclosure for this or any other function. In some non-limiting embodiments, locked resource 204 may be unlocked as a function of a successful and/or unsuccessful verification/validation.

Figure 3:
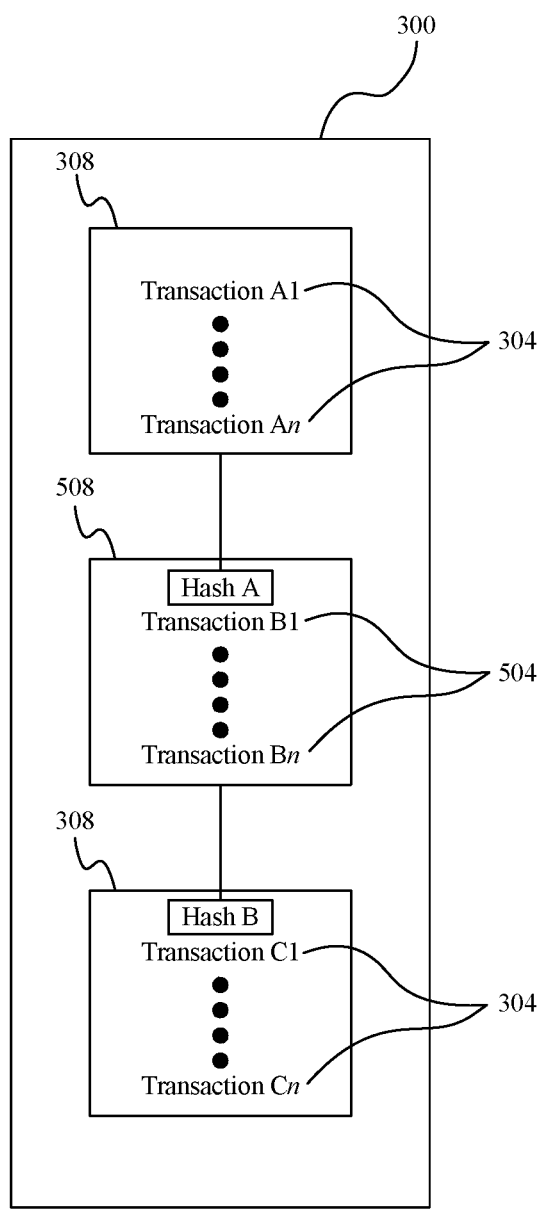
FIG. 3 is a diagrammatic representation of an exemplary embodiment of an immutable sequential listing.

Referring now to FIG. 3, an exemplary embodiment of an immutable sequential listing 300 is illustrated. Immutable sequential listing 300 may be consistent with immutable sequential listing 172 as described herein. Alternatively and additionally, immutable sequential listing 300 may be consistent with private layer 160 as described herein. Data elements are listing in immutable sequential listing 300; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail above; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a processor 104, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 10161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any processor 104 may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical cryptocurrency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third-party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a cryptocurrency. In one embodiment, a cryptocurrency is a digital, currency such as Bitcoins, Peercoins, Namecoins, and Litecoins. Cryptocurrency may be a clone of another cryptocurrency. The cryptocurrency may be an "alt-coin." Cryptocurrency may be decentralized, with no particular entity controlling it; the integrity of the cryptocurrency may be maintained by adherence by its participants to established protocols for exchange and for production of new currency, which may be enforced by software implementing the cryptocurrency. Cryptocurrency may be centralized, with its protocols enforced or hosted by a particular entity. For instance, cryptocurrency may be maintained in a centralized ledger, as in the case of the XRP currency of Ripple Labs, Inc., of San Francisco, Calif. In lieu of a centrally controlling authority, such as a national bank, to manage currency values, the number of units of a particular cryptocurrency may be limited; the rate at which units of cryptocurrency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new cryptocurrency to the miners. Quantities of cryptocurrency may be exchanged using at least a posted content as described above.

Figure 4:
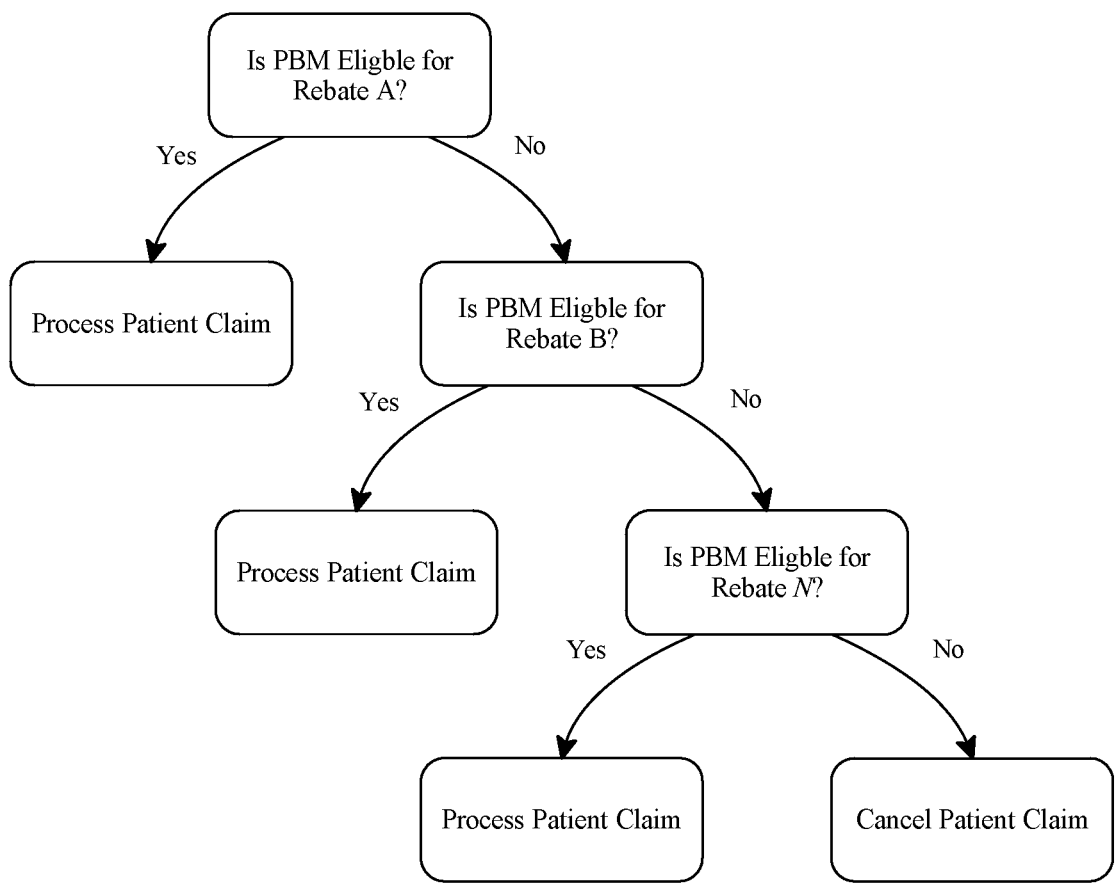
FIG. 4 is a block diagram of an exemplary embodiment of a decision tree in accordance with aspects of the present disclosure.

Referring now to FIG. 4, a block diagram of an exemplary embodiment of a decision tree 400 in accordance with aspects of the present disclosure is illustrated. Decision tree 400 may be consistent with any decision tree as described herein. As shown in FIG. 4, decision tree 400 may include a plurality of conditional nodes delineating the eligibility of a user's claim for a rebate to be provided to a PBM. In another non-limiting embodiment decision tree 400 may represent the claim mapping function as described in the entirety of this disclosure. Decision tree 400 may include a plurality of conditional nodes identifying if a user's claim enables the PBM to receive a rebate. For instance, decision tree 400 may perform an algorithm to identify if the prescribed drug that the user purchases is related to any rebate requirements of a rebate agreement established between the PBM and a vendor payer. Person of ordinary skill in the art, upon reviewing the entirety of this disclosure, of the various embodiments of nodes for a decision tree in the context of rebate management.

Figure 5:
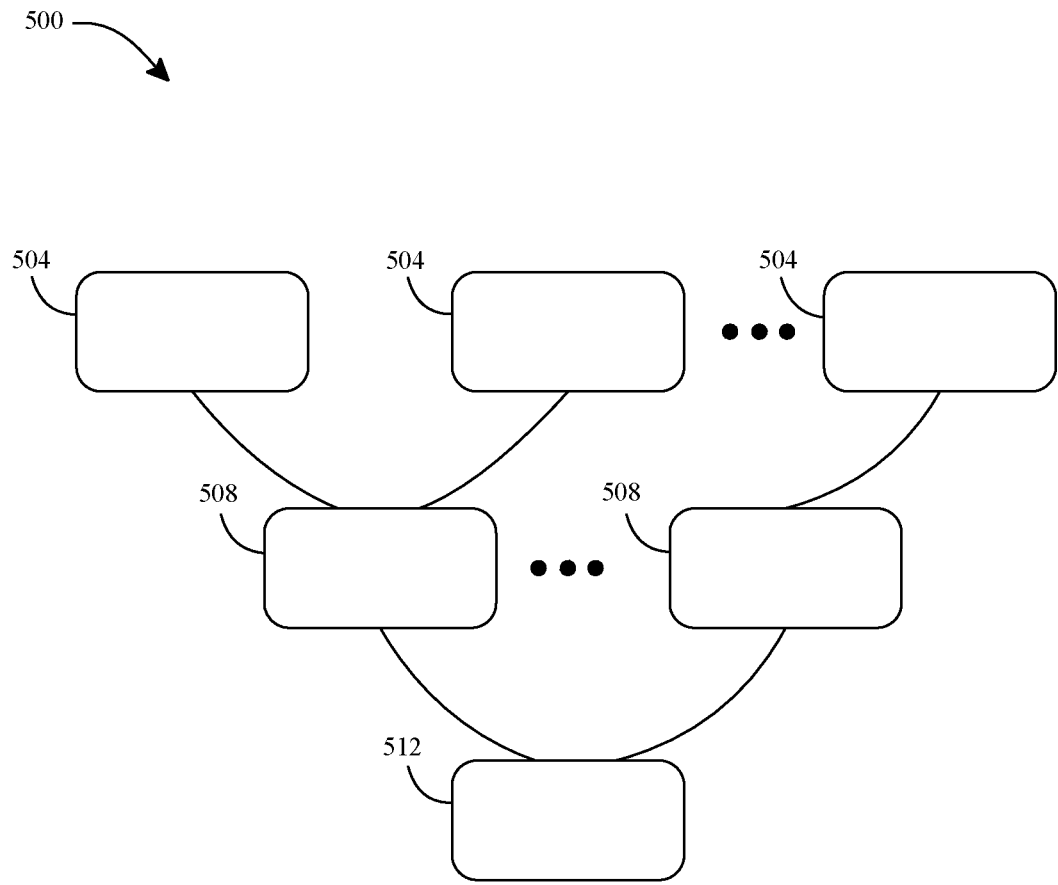
FIG. 5 is a block diagram of an exemplary embodiment of a cryptographic accumulator.

Referring now to FIG. 5, an exemplary embodiment of a cryptographic accumulator 500 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 500 has a plurality of accumulated elements 504, each accumulated element 504 generated from a lot of the plurality of data lots. Accumulated elements 504 are create using an encryption process, defined for this purpose as a process that renders the lots of data unintelligible from the accumulated elements 504; this may be a one-way process such as a cryptographic hashing process and/or a reversible process such as encryption. Cryptographic accumulator 500 further includes structures and/or processes for conversion of accumulated elements 504 to root 512 element. For instance, and as illustrated for exemplary purposes in FIG. 5, cryptographic accumulator 500 may be implemented as a Merkle tree and/or hash tree, in which each accumulated element 504 created by cryptographically hashing a lot of data. Two or more accumulated elements 504 may be hashed together in a further cryptographic hashing process to produce a node 508 element; a plurality of node 508 elements may be hashed together to form parent nodes 508, and ultimately a set of nodes 508 may be combined and cryptographically hashed to form root 512. Contents of root 512 may thus be determined by contents of nodes 508 used to generate root 512, and consequently by contents of accumulated elements 504, which are determined by contents of lots used to generate accumulated elements 504. As a result of collision resistance and avalanche effects of hashing algorithms, any change in any lot, accumulated element 504, and/or node 508 is virtually certain to cause a change in root 512; thus, it may be computationally infeasible to modify any element of Merkle and/or hash tree without the modification being detectable as generating a different root 512. In an embodiment, any accumulated element 504 and/or all intervening nodes 508 between accumulated element 504 and root 512 may be made available without revealing anything about a lot of data used to generate accumulated element 504; lot of data may be kept secret and/or demonstrated with a secure proof as described below, preventing any unauthorized party from acquiring data in lot.

Alternatively or additionally, and still referring to FIG. 5, cryptographic accumulator 500 may include a "vector commitment" which may act as an accumulator in which an order of elements in set is preserved in its root 512 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 500 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times as possible to itself to result in S, can be computed efficiently for certain elliptic curves.

Figure 6:
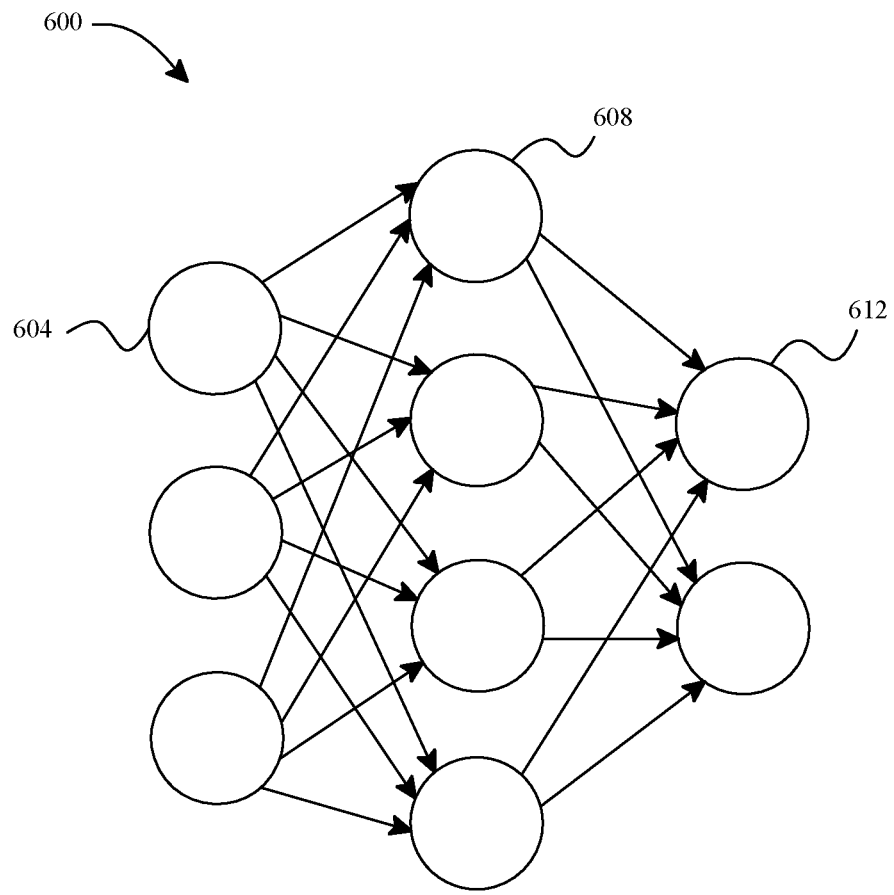
FIG. 6 is a diagrammatic representation of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
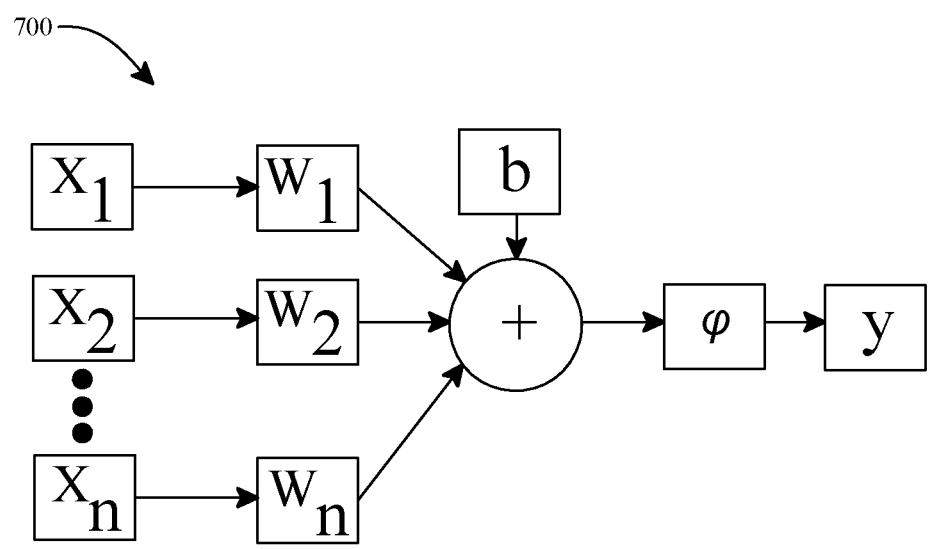
FIG. 7 is a diagrammatic representation of an exemplary embodiment of a node of a neural network.

Referring now to FIG. 7, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 8, an exemplary embodiment of a system 800 for a trusted computing architecture is illustrated. "Trusted computing," as used in this disclosure, is a technology enabling hardware and/or hardware manufacturers to exert control over what software does and does not run on a system by refusing to run unsigned software, and/or to make all software that does run auditable and transparent. In a non-limiting embodiment, the apparatus of FIG. 1 may incorporate system 800 for a trusted computing architecture. In a non-limiting embodiment, trusted computing may which system 812 and application 808 perform one or more actions, determinations, calculations, or the like as described in this disclosure. Trusted computing may also enable integrated data privacy involving NFTs in the launching of the NFTs on a decentralized exchange platform. Trusted computing may include a plurality of features such as, but not limited to, secure boot configured to allow an operating system to boot into a defined and trusted configuration, curtained memory configured to provide strong memory isolation, a memory configured to be unreadable by other processes including operating systems and debuggers, sealed storage configured to allow software to keep cryptographically secure secrets, secure I/O thwarts configured to attack key-stroke loggers and screen scrapers, integrity measurement configured to compute hashes of executable code, configuration data, and other system state information, and remote attestation configured to allow a trusted device to present reliable evidence to remote parties about the software it is running.

In a non-limiting embodiment, and still referring to FIG. 8, trusted computing may include a secure coprocessor and/or cryptoprocessor such as without limitation a Trusted Platform Module (TPM) 820. A "Trusted Platform Module," as used in this disclosure, is a tamper resistant piece of cryptographic hardware built on a system board or other hardware that implements primitive cryptographic functions on which more complex features can be built. A client machine 816 may be integrated with TPM 820 architecture which a server machine 824 may verify. In a non-limiting embodiment, client machine 816 may be consistent with a computing device as described in the entirety of this disclosure. In another non-limiting embodiment, client machine 816 may be consistent with apparatus 100. In a non-limiting embodiment, TPM may be configured to serve as a local root of trust for the operations of attestation. TPM may be capable of a plurality of security measures such as, but not limited to, performing public key cryptographic operations, computing hash functions, key management and generation, secure storage of keys and other secret data, random number generation, integrity measurement, attestation, digital signatures, and the like thereof. In a non-limiting embodiment, the TPM may be manufactured with a public and private key pair, or more generally a secret datum that may be verified using a secure proof, built as an endorsement key (EK) built into hardware, such as without limitation read-only memory (ROM) or the like. An "endorsement key," as used in this disclosure, is encryption key or other secret datum that is permanently embedded in Trusted Platform Module (TPM) security hardware. In a non-limiting embodiment, the EK is unique to a particular TPM and is signed by a trusted server machine 824 such as a certification authority (CA). A "certificate authority," as used in this disclosure, is an entity that issues digital certificates.

In a non-limiting embodiment and still referring to FIG. 8, a TPM may perform an integrity measurement to enable a user and/or process access to private data. An "integrity measurement," as used in this disclosure, is a technique to enable a party to query the integrity status of software running on a platform, e.g., through attestation challenges. In a non-limiting embodiment, an integrity measurement may include the process by which information about the software, hardware, and configuration of a system is collected and digested. For example and without limitation, at load-time, TPM may use a hash function to fingerprint an executable, an executable plus its input data, or a sequence of such files. These hash values may be used in attestation to reliably establish code identity to remote or local verifiers such as server machine 824. Hash values can also be used in conjunction with a sealed storage feature. A secret may be sealed along with a list of hash values of programs that are allowed to unseal the secret. This may allow creation of data files that can only be opened by specific applications.

With continued reference to FIG. 8, the TPM may also include security protocols such as attestations. An "attestation," as used in this disclosure, is a mechanism for software to prove and/or record its identity and/or execution history. Attestation may include creating a measurement, or cryptographic hash, of a process's executable code, inputs, and/or outputs, which may be signed by a TPM; this may create a tamper-proof and verifiable record of exactly what process has been performed, with a TPM signature proving that the measurement was performed by and/or with the TPM and on the device indicated. A goal of attestation may be to prove to a remote party that an operating system, main program, and/or application software are intact and trustworthy. A verifier of an attestation may trust that attestation data is accurate because it is signed by TPM 820 whose key may be certified by a CA. Attestation may include a remote attestation. A "remote attestation," as used in this disclosure, is method by which a host (client) authenticates it's hardware and software configuration to a remote host (server). The goal of remote attestation is to enable a remote system (challenger) to determine the level of trust in the integrity of platform of another system (attestator). Remote attestation also allows a program to authenticate itself. In some embodiments, remote attestation and remote attestation is a means for one system to make reliable statements about the software it is running to another system. A remote party can then make authorization decisions based on that information. In a non-limiting embodiment, attestation may be performed by TPM 820 configured to serve as a local root of trust for the operations of attestation. In another non-limiting embodiment, an attestation may include a direct anonymous attestation (DAA). A "direct anonymous attestation," as used in this disclosure, is a cryptographic primitive which enables remote authentication of a trusted computer whilst preserving privacy of the platform's user. Persons skilled in the art, upon reviewing the entirety of this disclosure, will be aware of the various embodiments of an attestation protocol for purposes as described herein.

Figure 9:
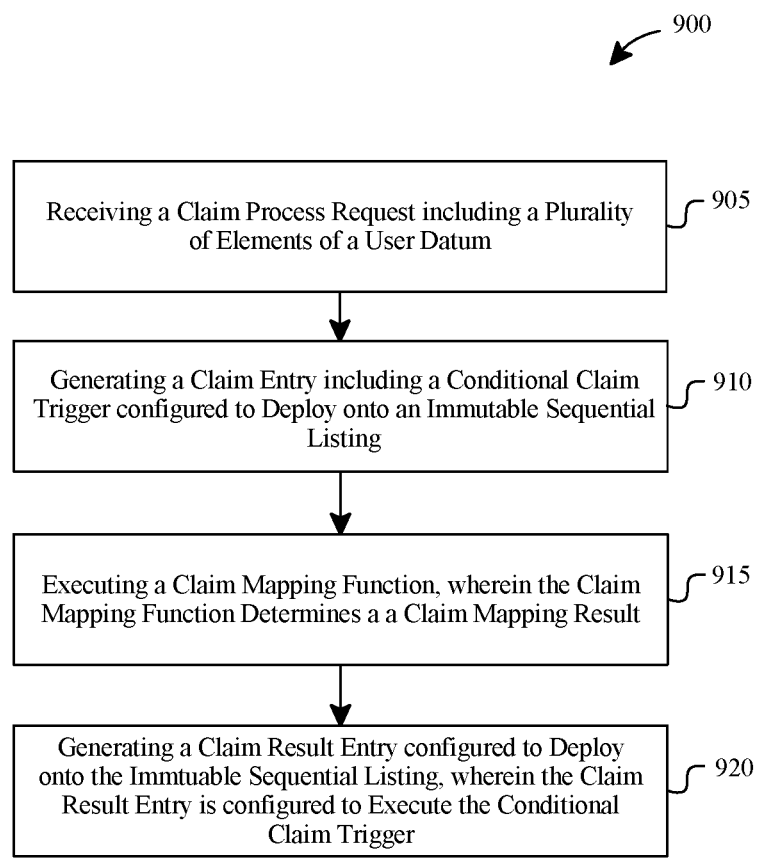
FIG. 9 is a flow diagram illustrating an exemplary workflow of a method for secure decentralized rebate management.

Referring now to FIG. 9, a flow diagram of an exemplary embodiment of a method 900 for secure decentralized rebate management is illustrated. At step 905, method 900 includes receiving, by at least a processor communicatively connected to a memory, a claim process request, wherein the claim process request comprises a plurality of elements of a user data. The at least a processor and memory may be comprised in a computing device wherein the computing device is consistent with any computing device as described herein. The claim process request may include any claim process request as described herein. In another non-limiting embodiment receiving the claim process request may include receiving from a retail entity. The retail entity may include any retail entity as described herein. Method 900 may include receiving a user data and/or a plurality of elements of user data. The user data may include any user data as described herein. Person of ordinary skill in the art, upon reviewing the entirety of this disclosure, of the various embodiments of a user data in the context of receiving a claim process request.

Still referring to FIG. 9, at step 910, method 900 includes generating a claim initial entry configured to deploy on an immutable sequential listing, wherein the claim initial entry comprises a conditional claim trigger. The claim initial entry may include any claim initial entry as described herein. The immutable sequential listing may include any immutable sequential listing as described herein. In another non-limiting embodiment, method 900 may include generating the conditional claim trigger wherein the conditional claim trigger is consistent with any conditional claim trigger as described herein.

Still referring to FIG. 9, at step 915, method 900 include executing a claim mapping function, wherein the claim mapping function comprises generating a conditional rebate array, wherein the conditional rebate array includes a plurality of rebate requirements, matching each rebate requirement to each element of the user data, wherein the at least a processor is configured to deploy a claim test entry representing each match on a private layer, and determining a claim mapping result. The claim mapping function may be consistent with any claim mapping function as described herein. The private layer may include any private layer as described herein. The conditional rebate array may include any conditional rebate array as described herein. The claim mapping result may include any claim mapping result as described herein. Person of ordinary skill in the art, upon reviewing the entirety of this disclosure, of the various embodiments and methods for matching contents of claim process request to rebate requirements and vice versa for purposes as described herein.

In a non-limiting embodiment, method 900 may include generating the conditional rebate array as a function of a conditional array machine-learning model. The conditional array machine-learning model may include any conditional array machine-learning model as described herein. Method 900 may include training the conditional array machine-learning model using a rebate training set, wherein the rebate training set comprises a rebate requirement correlated to a rebate qualification and outputting the conditional rebate array as a function of the conditional array machine-learning model as a function of the rebate training set. In another non-limiting embodiment, generating the conditional rebate array may further include receiving a feedback datum, generating a feedback training set, wherein the feedback training set comprises an element rebate requirement update correlated to the claim mapping result, training a conditional array machine-learning model using the feedback training set, and outputting the conditional rebate array as a function of the conditional array machine-learning model. Person of ordinary skill in the art, upon reviewing the entirety of this disclosure, of the various embodiments of using machine-learning and feedback for purposes as described herein.

In another non-limiting embodiment, and still referring to FIG. 9, method 900 may include storing a plurality of entries comprising elements of the user data in the private layer, wherein storing the plurality of entries includes generating a user data entry comprising an element of the user data and deploying the user data entry on the private layer. In another non-limiting embodiment, method 900 may include verifying, as a function of a crypto-chip authentication, each user data entry. The crypto-chip authentication may include any crypto-chip authentication as described herein. In some non-limiting embodiments storing the plurality of entries comprises generating a Merkle tree, wherein each node of the Merkle tree comprises a plurality of nodes comprising the user data entry, verifying the user data as a function as a function of a Merkle proof, and, generating the claim result entry as a function of the Merkle proof wherein the claim result entry comprises a Merkle root of the Merkle tree identifying the claim mapping result. Method 900 may also include unlocking a locked resource of the conditional claim as a function of the verification. Method 900 may also include generating a decision tree from the claim mapping function, wherein each node of the decision tree comprises a test of the claim test entry. In a non-limiting embodiment, executing the claim mapping function includes receiving an external datum using an oracle entity, deploying an external datum entry comprising the external datum on the private layer, and updating the conditional rebate array as a function of the external datum. Person of ordinary skill in the art, upon reviewing the entirety of this disclosure, of the various methods and subsequent actions of transaction entries in the context of blockchain.

Still referring to FIG. 9, at step 920, method 900 includes generating a claim result entry configured to deploy on the immutable sequential listing, wherein the claim result entry is configured to execute the conditional claim trigger. The claim result entry may include any claim result entry as described herein. Person of ordinary skill in the art, upon reviewing the entirety of this disclosure, of the various embodiments of deploying a final transaction entry in the context of concluding a claim process request.

Figure 10:
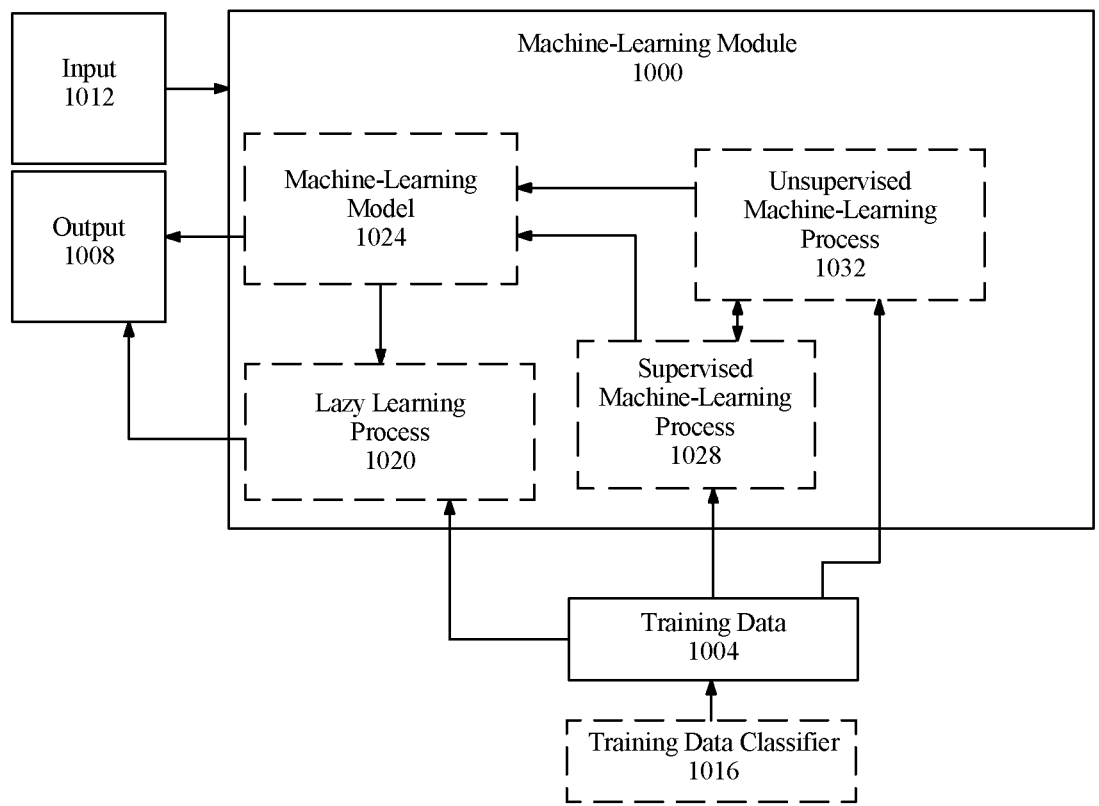
FIG. 10 is a block diagram of an exemplary embodiment of a machine-learning model.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, inputs may include a feedback datum and user data. Outputs may include a conditional rebate array.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to claim mapping results and/or updated rebate requirements for which a subset of training data may be selected.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs as described above as inputs, any outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
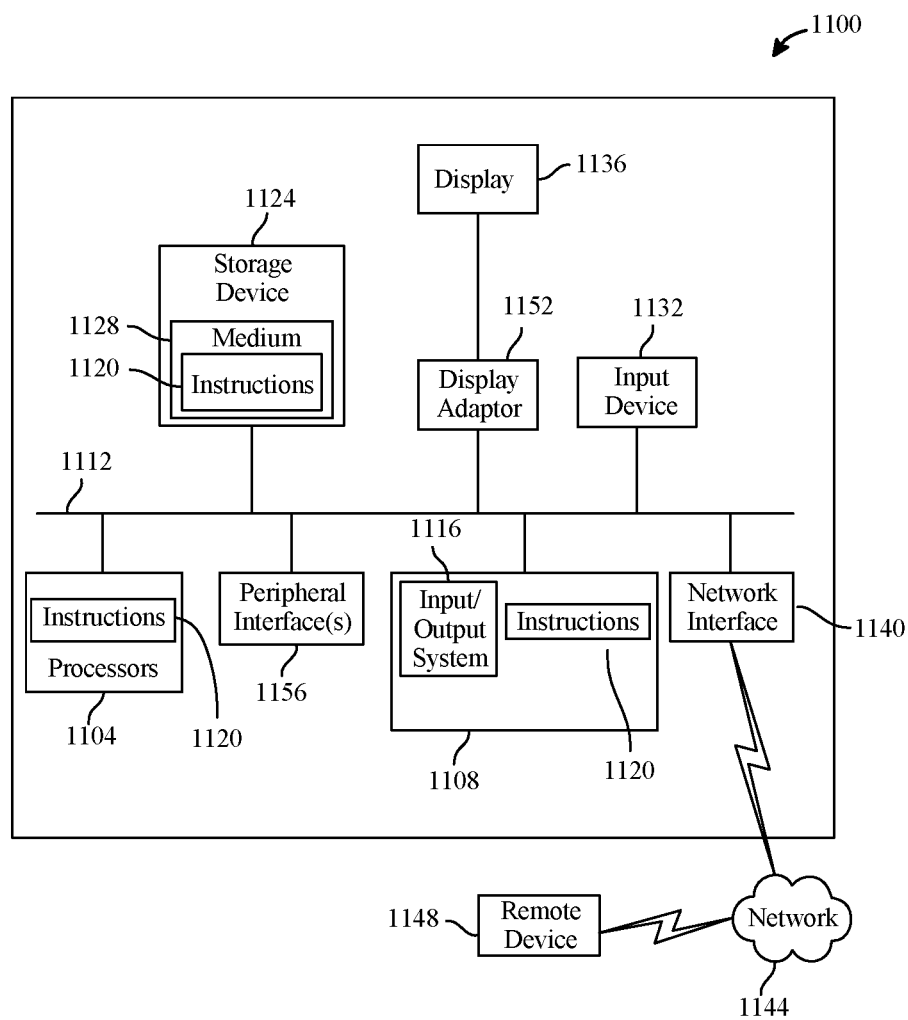
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for secure decentralized rebate management, the apparatus comprising:
   at least a processor; and
   a memory communicatively connected to the at least a processor, the memory containing instructions configuring the at least a processor to:
   receive a claim process request, wherein the claim process request comprises a plurality of elements of a user data;
   generate a claim initial entry configured to be deployed on an immutable sequential listing, wherein the claim initial entry comprises a conditional claim trigger;
   execute a claim mapping function, wherein the claim mapping function comprises the at least a processor to:
   generate a conditional rebate array as a function of a conditional array machine-learning model, wherein:
   the conditional rebate array comprises a plurality of rebate requirements;
   the conditional rebate array is generated as a function of the conditional array machine-learning model, wherein the at least a processor is configured to:
   train the conditional array machine-learning model using a rebate training set, wherein the rebate training set comprises a rebate requirement correlated to a rebate qualification; and
   output the conditional rebate array as a function of the conditional array machine-learning model and the rebate training set;
   match each rebate requirement to each element of the user data, wherein the at least a processor is configured to deploy a plurality of claim test entries, wherein each claim test entry of the plurality of claim test entries represents a match on a private layer; and
   determine a claim mapping result; and generate a claim result entry configured to deploy on the immutable sequential listing, wherein the claim result entry is configured to execute the conditional claim trigger.

2. The apparatus of claim 1, wherein the at least a processor is further configured to store a plurality of entries comprising elements of the user data in the private layer, wherein the at least a processor is configured to:
generate a user data entry comprising an element of the user data; and
deploy the user data entry on the private layer.

3. The apparatus of claim 2, wherein the at least a processor is further configured to verify each user data entry as a function of a crypto-chip authentication.

4. The apparatus of claim 2, wherein the at least a processor is further configured to:
generate a Merkle tree, wherein:
the Merkle tree comprises a plurality of nodes;
the plurality of nodes comprises a cryptographic accumulation of the user data entry; and
the claim result entry comprises a Merkle root of the Merkle tree identifying the claim mapping result;
verify the user data as a function as a function of a Merkle proof; and
generate the claim result entry as a function of the Merkle proof.

5. The apparatus of claim 4, wherein the conditional claim trigger comprises a locked resource configured to unlock as a function of the verification.

6. The apparatus of claim 1, wherein the claim mapping function comprises a decision tree, wherein each node of the decision tree comprises a test of a claim test entry of the plurality of claim test entries.

7. The apparatus of claim 1, wherein the claim mapping function further configures the at least a processor to:
receive an external datum using an oracle entity;
deploy an external datum entry comprising the external datum on the private layer; and
update the conditional rebate array as a function of the external datum.

8. The apparatus of claim 1, wherein the at least a processor is further configured to generate the conditional rebate array as a function of a conditional commitment received from a participating entity.

9. The apparatus of claim 1, wherein generating the claim initial entry further comprises verifying the claim initial entry using a digitally signed assertion.

10. The apparatus of claim 1, wherein the conditional rebate array is generated as a function of a feedback datum, wherein the at least a processor is configured to:
generate a feedback training set, wherein the feedback training set comprises rebate requirement update correlated to the claim mapping result;
train a conditional array machine-learning model using the feedback training set; and
output the conditional rebate array as a function of the conditional array machine-learning model.

11. A method for secure decentralized rebate management, the method comprising:
receiving, by at least a processor communicatively connected to a memory, a claim process request, wherein the claim process request comprises a plurality of elements of a user data;
generating a claim initial entry configured to be deployed on an immutable sequential listing, wherein the claim initial entry comprises a conditional claim trigger;
executing a claim mapping function, wherein the claim mapping function comprises:
generate a conditional rebate array as a function of a conditional array machine-learning model, wherein:
the conditional rebate array comprises a plurality of rebate requirements;
the conditional rebate array is generated as a function of the conditional array machine-learning model, wherein the at least a processor is configured to:
train the conditional array machine-learning model using a rebate training set, wherein the rebate training set comprises a rebate requirement correlated to a rebate qualification; and
output the conditional rebate array as a function of the conditional array machine-learning model and the rebate training set;
matching each rebate requirement to each element of the user data, wherein the at least a processor is configured to deploy a plurality of claim test entries, wherein each claim test entry of the plurality of claim test entries represents a match on a private layer; and
determining a claim mapping result; and
generating a claim result entry configured to deploy on the immutable sequential listing, wherein the claim result entry is configured to execute the conditional claim trigger.

12. The method of claim 11, wherein method further comprises storing a plurality of entries comprising elements of the user data in the private layer, wherein storing the plurality of entries comprises:
generating a user data entry comprising an element of the user data; and
deploying the user data entry on the private layer.

13. The method of claim 12, wherein the method further comprises verifying, as a function of a crypto-chip authentication, each user data entry.

14. The method of claim 11, wherein the method comprises:
generating a Merkle tree, wherein:
the Merkle tree comprises a plurality of nodes;
the plurality of nodes comprises a cryptographic accumulation of the user data entry; and
the claim result entry comprises a Merkle root of the Merkle tree identifying the claim mapping result;
verifying the user data as a function as a function of a Merkle proof; and
generating the claim result entry as a function of the Merkle proof.

15. The method of claim 14, wherein the method further comprises unlocking a locked resource of the conditional claim as a function of the verification.

16. The method of claim 11, wherein the claim mapping function comprises a decision tree, wherein each node of the decision tree comprises a test of a claim test entry of the plurality of claim test entries.

17. The method of claim 11, wherein executing the claim mapping function further comprises:
receiving an external datum using an oracle entity;
deploying an external datum entry comprising the external datum on the private layer; and
updating the conditional rebate array as a function of the external datum.

18. The method of claim 11, wherein the method further comprises generating the conditional rebate array as a function of a conditional commitment received from a participating entity.

19. The method of claim 11, wherein generating the claim initial entry further comprises verifying the claim initial entry using a digitally signed assertion.

20. The method of claim 11, wherein generating the conditional rebate array further comprises:
- receiving a feedback datum;
- generating a feedback training set, wherein the feedback training set comprises an element rebate requirement update correlated to the claim mapping result;
- training a conditional array machine-learning model using the feedback training set; and
- outputting the conditional rebate array as a function of the conditional array machine-learning model.

\* \* \* \* \*